US012694624B2

(12) United States Patent
Lal et al.

(10) Patent No.: US 12,694,624 B2
(45) Date of Patent: Jul. 28, 2026

(54) SYSTEM AND METHOD FOR CONTROLLING MEDIA PLAYING IN AUGMENTED REALITY DEVICES

(71) Applicant: Adeia Guides Inc., San Jose, CA (US)

(72) Inventors: Dhananjay Lal, Englewood, CO (US); Reda Harb, Tampa, FL (US); Zhiyun Li, Kenmore, WA (US)

(73) Assignee: ADEIA GUIDES INC., San Jose, CA (US)

( * ) Notice: Subject to any disclaimer, the term of this patent is extended or adjusted under 35 U.S.C. 154(b) by 319 days.

(21) Appl. No.: 18/217,214

(22) Filed: Jun. 30, 2023

(65) Prior Publication Data

US 2025/0005869 A1      Jan. 2, 2025

(51) Int. Cl.
*G06T 19/00*        (2011.01)
*G06F 3/01*        (2006.01)
*G06V 10/46*        (2022.01)

(52) U.S. Cl.
CPC ............ *G06T 19/006* (2013.01); *G06F 3/013* (2013.01); *G06V 10/462* (2022.01)

(58) Field of Classification Search
CPC ...... G06T 19/006; G06V 10/462; G06F 3/013
USPC ........................................................ 345/633
See application file for complete search history.

(56) References Cited

U.S. PATENT DOCUMENTS

| | | | |
|---|---|---|---|
| 8,487,838 B2 | 7/2013 | Lewis et al. | |
| 9,372,348 B2 | 6/2016 | Hilkes | |
| 10,231,614 B2 | 3/2019 | Krueger | |
| 10,241,569 B2 | 3/2019 | Lanman et al. | |
| 10,534,982 B2 | 1/2020 | Linden | |
| 2014/0375558 A1* | 12/2014 | Conness ............ | H04N 21/4223 |
| | | | 345/156 |
| 2015/0036999 A1 | 2/2015 | Batur et al. | |
| 2019/0187954 A1 | 6/2019 | Cricri et al. | |
| 2019/0302883 A1 | 10/2019 | Greer et al. | |
| 2021/0240260 A1* | 8/2021 | Ronkainen ............. | G06F 3/017 |
| 2022/0189433 A1 | 6/2022 | Grundhoefer et al. | |
| 2023/0008596 A1 | 1/2023 | Shanware | |

(Continued)

FOREIGN PATENT DOCUMENTS

EP            3123279 B1      5/2020

OTHER PUBLICATIONS

"Control iPad with an eye-tracking device," Apple, https://support.apple.com/guide/ipad/use-an-eye-tracking-device-ipad2cd35723/ipados.

(Continued)

*Primary Examiner* — Thomas J Lett
(74) *Attorney, Agent, or Firm* — HG LAW LLP

(57)        ABSTRACT

Embodiments herein provide control of an AR media asset generated on a display of an AR device. The AR media asset is displayed as part of a 3D environment and at a first depth in the 3D environment. A gaze of a user of the AR device is determined to be focused at a second depth in the 3D environment. The second depth is deeper than the first depth. In response to determining the gaze of the user is focused at the second depth, the AR media asset is repositioned to a third depth in the 3D environment. The third depth is deeper than the second depth. The AR media asset is automatically moved to allow the user to focus at the second depth, which allows the user to pay attention to the physical surroundings and consume the AR media asset while on-the-go.

18 Claims, 12 Drawing Sheets

(56)     References Cited

U.S. PATENT DOCUMENTS

2024/0192770 A1* 6/2024 Maschmeyer .......... G06F 3/013

OTHER PUBLICATIONS

"Eye tracker sampling frequency," tobii, https://connect.tobii.com/s/article/eye-tracker-sampling-frequency?language=en_US.

"How eye tracking works in XR," tobii, https://www.tobii.com/products/integration/xr-headsets.

"'LookAway Player' brings Samsung's Smart Pause-inspired feature to iPhone," 9to5Mac, https://9to5mac.com/2013/04/10/lookaway-player-brings-samsungs-smart-pause-inspired-feature-to-iphone/.

"Microsoft HoloLens 2," Microsoft, https://www.microsoft.com/en-us/hololens.

"ThinkReality A3," Lenovo, https://www.lenovo.com/us/en/thinkrealitya3/.

"ThirdEye X2 Mr Glasses," ThirdEye, https://www.thirdeyegen.com/x2-smart-glasses.

"Vuzix Blade 2 Smart Glasses," Vuzix, https://www.vuzix.com/products/vuzix-blade-2-smart-glasses.

"What is Augmented Reality?," XREAL, https://www.xreal.com/.

Amadeo, Ron, "Xiaomi shows off smart glasses with an all-green microLED waveguide display," arsTECHNICA, https://arstechnica.com/gadgets/2021/09/xiaomis-concept-smart-glasses-have-an-all-green-heads-up-display/ (2021).

Andersson, Richard, et al., "One algorithm to rule them all? An evaluation and discussion of ten eye movement event-detection algorithms," Behavior Research Methods vol. 49, pp. 616-637 (2017).

Birawo, Birtukan, et al., "Review and Evaluation of Eye Movement Event Detection Algorithms," Sensors 2022, 22(22), 8810 (2022).

Chen, Kang-chen, et al., "Visual Attention and Eye Movements," Donald Bren School of Information and Computer Sciences (2008).

Dormehl, Luke, "Apple's AR Glasses May Be Able to Identify the Location of Nearby Sounds," Make Use Of_, https://www.makeuseof.com/apples-ar-glasses-identify-location-of-nearby-sounds/ (2021).

Duchowski, Andrew T., et al., 3D Gaze in Virtual Reality: Vergence, Calibration, Event Detection, Procedia Computer Science, vol. 207, p. 1641-1648 (2022).

Hill, Brandon, "Nreal Air Review: Gaming and Media Greatness Marred by Dongle Madness," tom'sHARDWARE, https://www.tomshardware.com/reviews/nreal-air (2022).

Kanani, Hiren, "AR Glasses VS Smart Glasses: Understanding the Difference," Plutomen, https://pluto-men.com/ar-glasses-vs-smart-glasses-difference/ (2022).

Konrad, Robert, et al., "Accommodation-invariant Computational Near-eye Displays," ACM Transactions on Graphics, vol. 36, No. 4, Art. 88 (2017).

Kramida, Gregory, "Resolving the Vergence-Accommodation Conflict in Head Mounted Displays," IEEE Transactions on Visualization and Computer Graphics, vol. 22, Issue: 7, 01 (2016).

Kuerzel, Eric, "How Eye Tracking is Driving the Next Generation of AR and VR," VRScout, https://vrscout.com/news/eye-tracking-driving-next-generation-ar-vr/ (2017).

Llanes-Jurado, Jose, et al., "Development and Calibration of an Eye-Tracking Fixation Identification Algorithm for Immersive Virtual Reality," Sensors 2020, 20(17), 4956 (2020).

Mardanbegi, Diako, et al., "Resolving Target Ambiguity in 3D Gaze Interaction through VOR Depth Estimation," Association for Computing Machinery (2019).

Padmanaban, Nitish, et al., "Optimizing virtual reality for all users through gaze-contingent and adaptive focus displays," PNAS, vol. 114, No. 9, pp. 2183-2188 (2017).

Puig, Maria Sole, et al., "A Role of Eye Vergence in Covert Attention," PLoS ONE 8(1): e52955 (2013).

Salvucci, Dario D., et al., "Identifying Fixations and Saccades in Eye-Tracking Protocols," Proceedings of the Eye Tracking Research and Applications Symposium, pp. 71-78 (2000).

Santini, Thiago, et al., "Bayesian Identification of Fixations, Saccades, and Smooth Pursuits," Proceedings of the Ninth Biennial ACM Symposium on ETRA '16, pp. 163-170 (2016).

Sluka, Tomas, "5 Ways to Address AR's Vergence Accommodation Conflict," ARinsider, https://arinsider.co/2022/06/22/5-ways-to-address-ars-vergence-accommodation-conflict/ (2022).

Sojasingarayar, Abonia, "Faster R-CNN vs YOLO vs SSD—Object Detection Algorithms," IBM Data Science in Practice, https://medium.com/ibm-data-ai/faster-r-cnn-vs-yolo-vs-ssd-object-detection-algorithms-18badb0e02dc (2022).

Toyama, Takumi, "Attention Engagement and Cognitive State Analysis for Augmented Reality Text Display Functions," Proceedings of the 20th International Conference on Intelligent User Interfaces (2015).

U.S. Appl. No. 17/898,649, filed Aug. 30, 2022, entitled Systems and Methods for Pinning Content Items to Locations in an Augmented Reality Display Based on User Preferences.

U.S. Appl. No. 17/898,650, filed Aug. 30, 2022, entitled Systems and Methods for Pinning Content Items to Locations in an Augmented Reality Display Based on User Preferences.

U.S. Appl. No. 17/898,934, filed Aug. 30, 2022, entitled Systems and Methods for Controlling Display Playback via an Extended Reality Device.

U.S. Appl. No. 17/949,842, filed Sep. 21, 2022, entitled Field of Vision Audio Control for Physical or Mix of Physical and Extended Reality Media Displays in a Spatially Mapped Space.

U.S. Appl. No. 18/214,119, filed Jun. 26, 2023, entitled Systems and Methods for Bandwidth Control Based on Field of Vision for Multiple AR and Physical Televisions.

Wen, Q., et al., "Accurate Real-time 3D Gaze Tracking Using a Lightweight Eyeball Calibration," Eurographics 2020, vol. 39, No. 2 (2020).

* cited by examiner

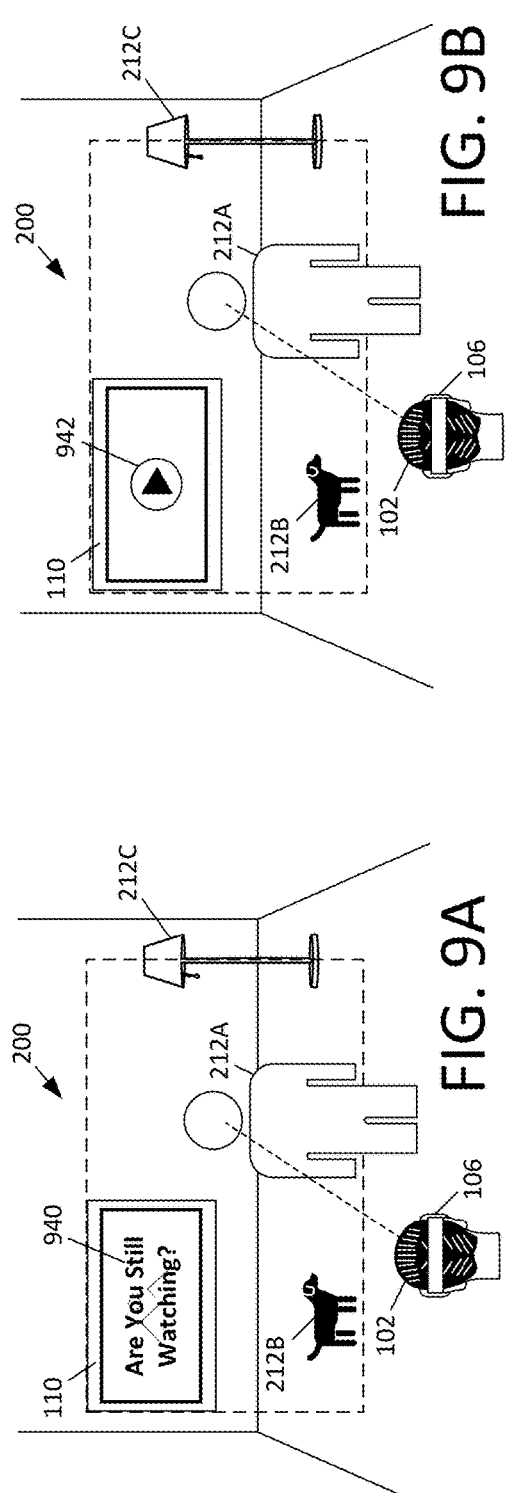
FIG. 9B
FIG. 9A
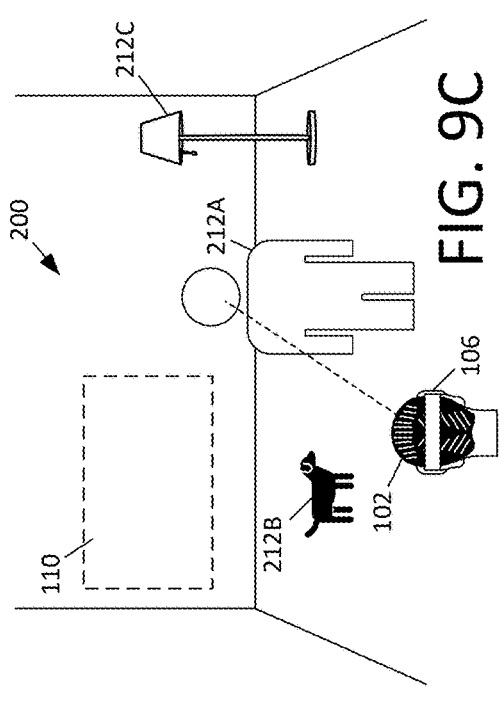
FIG. 9C

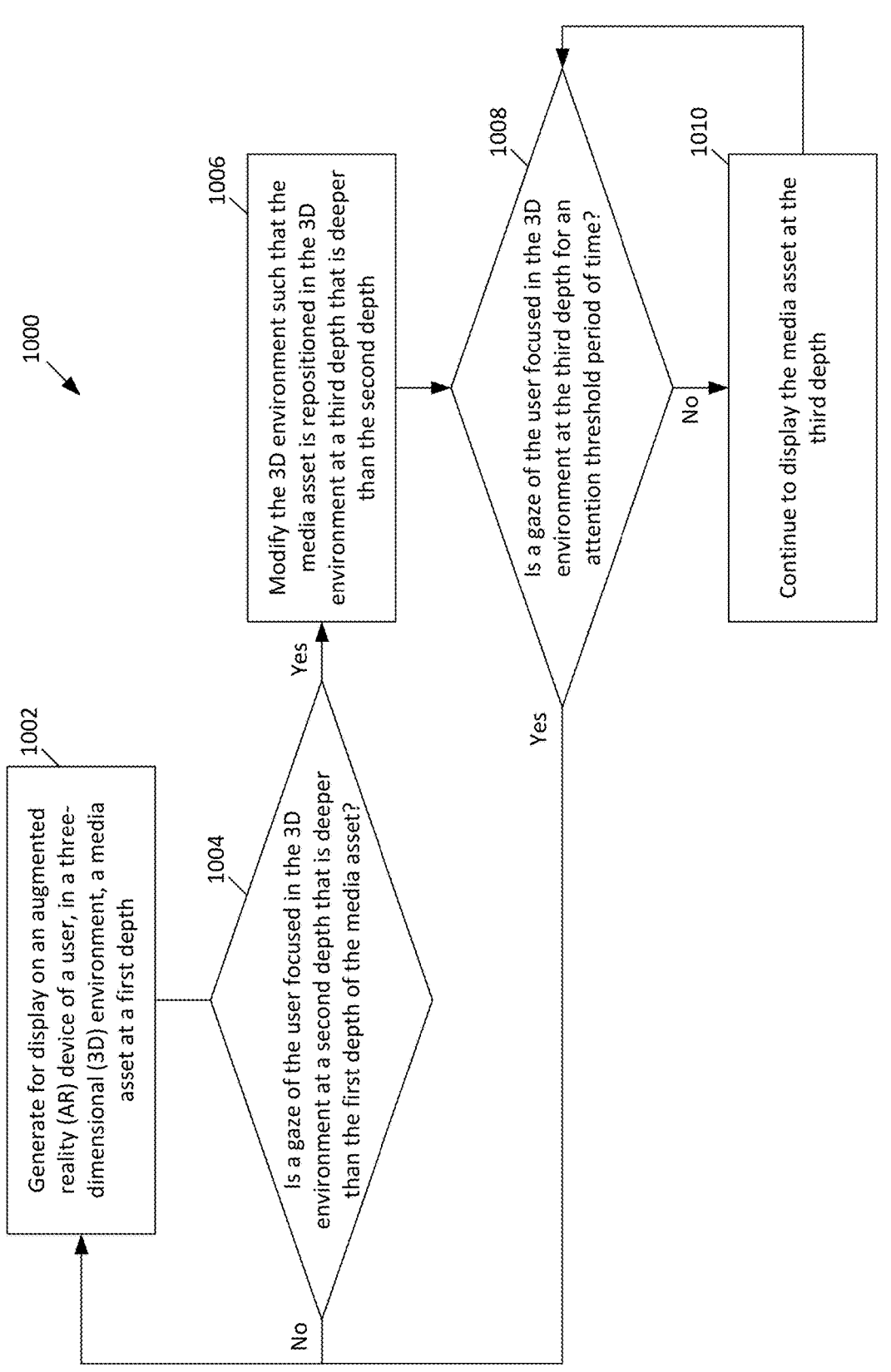

1000

1002

Generate for display on an augmented reality (AR) device of a user, in a three-dimensional (3D) environment, a media asset at a first depth

1004

Is a gaze of the user focused in the 3D environment at a second depth that is deeper than the first depth of the media asset?

No

Yes

1006

Modify the 3D environment such that the media asset is repositioned in the 3D environment at a third depth that is deeper than the second depth

1008

Is a gaze of the user focused in the 3D environment at the third depth for an attention threshold period of time?

Yes

No

1010

Continue to display the media asset at the third depth

FIG. 10

SYSTEM AND METHOD FOR CONTROLLING MEDIA PLAYING IN AUGMENTED REALITY DEVICES

BACKGROUND

This disclosure is directed to systems and methods for controlling media playing in augmented reality devices.

SUMMARY

Head-mounted displays (HMDs), such as augmented reality (AR) devices, are a unique and interesting device for viewing media assets, such as movies, television (TV) shows, streaming content, or images, to name a few examples. Many AR devices allow media viewing as a full screen, where the virtual image is perceived at a certain depth from the user. Even at the maximum brightness, the media asset projection in AR devices typically has some transparency such that a user of the AR device may see objects behind the projection. This may be a useful feature since users can be aware of their surroundings while watching the media asset on a large virtual screen. AR devices also offer privacy to the user from onlookers when viewing the projected media asset, unlike smartphones, tablets or computers.

The media asset may be projected at a fixed location in relation to the user, typically at a distance in front of the user and centered relative to both eyes of the user. The AR device is tethered to the user's head such that the media asset is fixed at the same location in their field-of-view. A user may consume media assets on an AR device while "on-the-go." The user's attention may shift away from the media asset to focus on another object, such as a person, in the environment The user may want to reposition the media asset, pause the playing or viewing, or reduce the display size when environmental stimuli are received. This is not an automatic feature in AR devices. Thus, a means of automatically positioning media assets, using an AR device, in response to, or based on, the user's attention to objects in the surrounding environment is needed.

In one approach, pausing or adjusting media assets while using the AR device requires a user interface input from a peripheral device to move a cursor on a display of the AR device. The peripheral device may include a remote or a smartphone. The user interface input moves the cursor to a specific play, pause, or reduce size button on a media player shown on the display. But moving the cursor using a peripheral device is cumbersome, and diverts the user's attention away from the surrounding environment. While this approach allows control playing of the media asset, it does not allow the user to easily focus their attention on their surroundings.

In another approach, gestures may be used as a user interface input to pause or adjust the playing of the media asset. Specific gestures made using the user's hands or arms result in different actions for controlling the playing of the media asset. For example, different gestures may be used to pause playing and to change the resolution. However, using gestures may be cumbersome to the user or may exclude users with certain disabilities. Performing gestures may divert the user's attention away from the surrounding environment. Further, controlling the media asset using gestures may dissuade the user from consuming media assets in public places, such as while on public transportation, as the user may not want to draw attention from onlookers that are not consuming media assets. While this approach allows control of the playing of the media asset without a peripheral device, it does not allow the user to easily focus their attention on their surroundings and may dissuade consuming media assets while "on-the-go."

In another approach, a cursor on a display is controlled using a gaze of the user. The display may be opaque and of a two-dimensional (2D) viewing device, such as a smartphone or computer. A camera of the viewing device tracks the user's gaze, and the cursor moves to a point on the display on which the user's gaze is focused. A "click" may be performed by extended eye contact on an area of the display. A video may stop playing if the user looks away from the display. However, tracking the user's gaze is limited to the area of the viewing device, and in particular, to an x-y plane of the 2D viewing device. The user's gaze in a z-direction (e.g., depth) cannot be tracked accurately when the camera is not close to the user's eyes, such as in a smartphone or computer. Further, the display of the 2D viewing device is opaque and blocks objects located behind it, reducing an awareness of the user to the surroundings. While this approach provides limited automatic control of the media asset based on the user's attention to objects in the surrounding environment, it does not automatically position or reposition the media asset to the user to focus on the objects.

Automatically controlling media assets in HMD viewing using just 2D gaze vectors, such as in 2D viewing devices such as smartphones, typically will not work because a projected screen in AR is typically large. Further, as previously discussed, controlling a media asset in AR is cumbersome, so automatic media control would greatly improve the usability and user experience. Accordingly, there is a need to provide automatic control of a media asset, using an augmented reality (AR) device, in response to the user's attention to objects in the surrounding environment. Such a solution leverages the ability to determine the depth at which the user is focused while using a head-mounted display (HMD), such as an augmented reality (AR) device.

To solve these problems, systems and methods are provided herein for determining if a user is focused on a media asset and adjusting the media asset based on the determination.

In one approach, a media asset is generated on a display of an AR device, and may be referred to as an AR media asset. The AR media asset is displayed as part of a 3D environment and at a first depth in the 3D environment. A gaze of a user of the AR device is determined to be focused at a second depth in the 3D environment. The second depth is deeper than the first depth. In response to determining the gaze of the user is focused at the second depth, the AR media asset is repositioned at a third depth in the 3D environment. The third depth is deeper than the second depth. The AR media asset is automatically moved to allow the user to focus at the second depth, which allows the user to pay attention to the physical surroundings and consume the AR media asset while "on-the-go".

In some embodiments, the AR media asset is automatically paused when repositioned at the third depth to allow the user to focus at the second depth. When the gaze of the user focuses at the third depth at a later time, then the AR media asset is repositioned at the first depth and automatically resumed.

In some embodiments, a screen depth error threshold is used to determine the user's gaze is focused at the second depth. For example, the user's gaze may be focused at the second depth if the difference between the first and second depths is greater than the screen depth error threshold. The screen depth error threshold may prevent unnecessary modification of the AR media asset, which results in a better experience for the user and allows automatic control of the AR media asset.

In some embodiments, the AR media asset is repositioned from the first depth to the third depth if the user's gaze is focused at the second depth for a period of time greater than an attention threshold. For example, the attention threshold may be used to ensure the user is actually focused at the second depth and not momentarily distracted.

In some embodiments, the eye movement of the user is used to determine where the user is focused. For example, if the type of eye movement is fixation or smooth pursuit for a duration greater than an object focus threshold, then the user may be focused on a particular object. Using eye movement to control the playing of the media asset allows automatic control of the AR media asset without additional action from the user (e.g., peripheral devices, gestures, or voice commands).

In some embodiments, the AR media asset is repositioned from the third depth to the first depth if the user's gaze is focused at the third depth for a period of time greater than the attention threshold.

In some embodiments, the gaze of the user focuses at a fourth depth that is shallower than the first depth, and the media asset is automatically paused. In such embodiments, the media asset may not be repositioned from the first depth.

In another approach, the spatial screen displaying the media asset is moved or repositioned based on a bandwidth available to display the AR media asset. For example, if the bandwidth available to stream the AR media asset to the AR device is below threshold, then the player may request segments of the AR media asset at a lower available bitrate that can be retrieved using the currently available bandwidth, and the spatial screen may move to another position. The AR media asset (i.e., spatial screen) may be moved to a depth in the 3D environment that is greater than the first depth. The display size is reduced as the depth of the AR media asset is increased. In such embodiments, the resolution may remain unchanged. Adjusting the size of the AR screen or requesting media segments associated with the AR media asset based on available bandwidth may allow the automatic control of the AR media asset in dynamic connection environments (e.g., spotty Wi-Fi or cellular network) or as the user is on-the-go.

In some embodiments, only the size of the AR screen that is rendering the AR media asset is changed rather than the depth.

In another approach, a saliency map of the physical environment is used with the user interface input to the eye tracking system to determine if the user is focused on an object in the physical environment. The saliency map highlights regions of the physical environment that stand out. The regions that stand out may correspond to the likelihood that the user's gaze will focus on objects in the physical environment. The saliency map may be used to determine where the user is likely to be focused in the physical environment. The media asset is thereafter moved to increase the user's awareness of the physical surroundings by adjusting the location of the media asset to regions in the user's field-of-view that do not stand out (e.g., do not have a high visual saliency). The saliency map may reduce the processing power needed to monitor the user's gaze, which may enable automatic control of the AR media asset.

In another approach, the transparency of the AR media asset, or a portion of the AR media asset is adjusted to allow the user to focus on an object in the physical environment.

For example, if the AR media asset is projected over an object on which the user's gaze is focused, and the object is located at a depth that is greater than the depth of the AR media asset, then the transparency of the AR media asset is increased to allow the user to look through the AR media asset and focus on the object. Adjusting the transparency of the AR media asset may allow the user to pay attention to the physical surroundings and consume the AR media asset while on-the-go.

Using the methods described herein, a user may have awareness of his or her surroundings while consuming an AR media asset on an AR device. The playing of the AR media asset is controlled based on a user interface input indicating what the user is focused on. A media system uses the user interface input to determine if a gaze of the user is focused on the AR media asset or an object in the user's surroundings. If the user is focused on the object, then the media system positions the AR media asset at a depth that is deeper than the depth of the object, allowing the user to focus on the object without distraction.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 9A shows an illustrative diagram of presenting a notification based on a user's gaze, in accordance with some embodiments of this disclosure;

FIG. 9B shows an illustrative diagram of pausing a media asset based on a user's gaze, in accordance with some embodiments of this disclosure;

FIG. 9C shows an illustrative diagram of hiding a media asset based on a user's gaze, in accordance with some embodiments of this disclosure;

FIG. 10 is flowchart of a detailed illustrative process for positioning an AR media asset to a different depth, in accordance with some embodiments of this disclosure.

DETAILED DESCRIPTION

Figure 1:
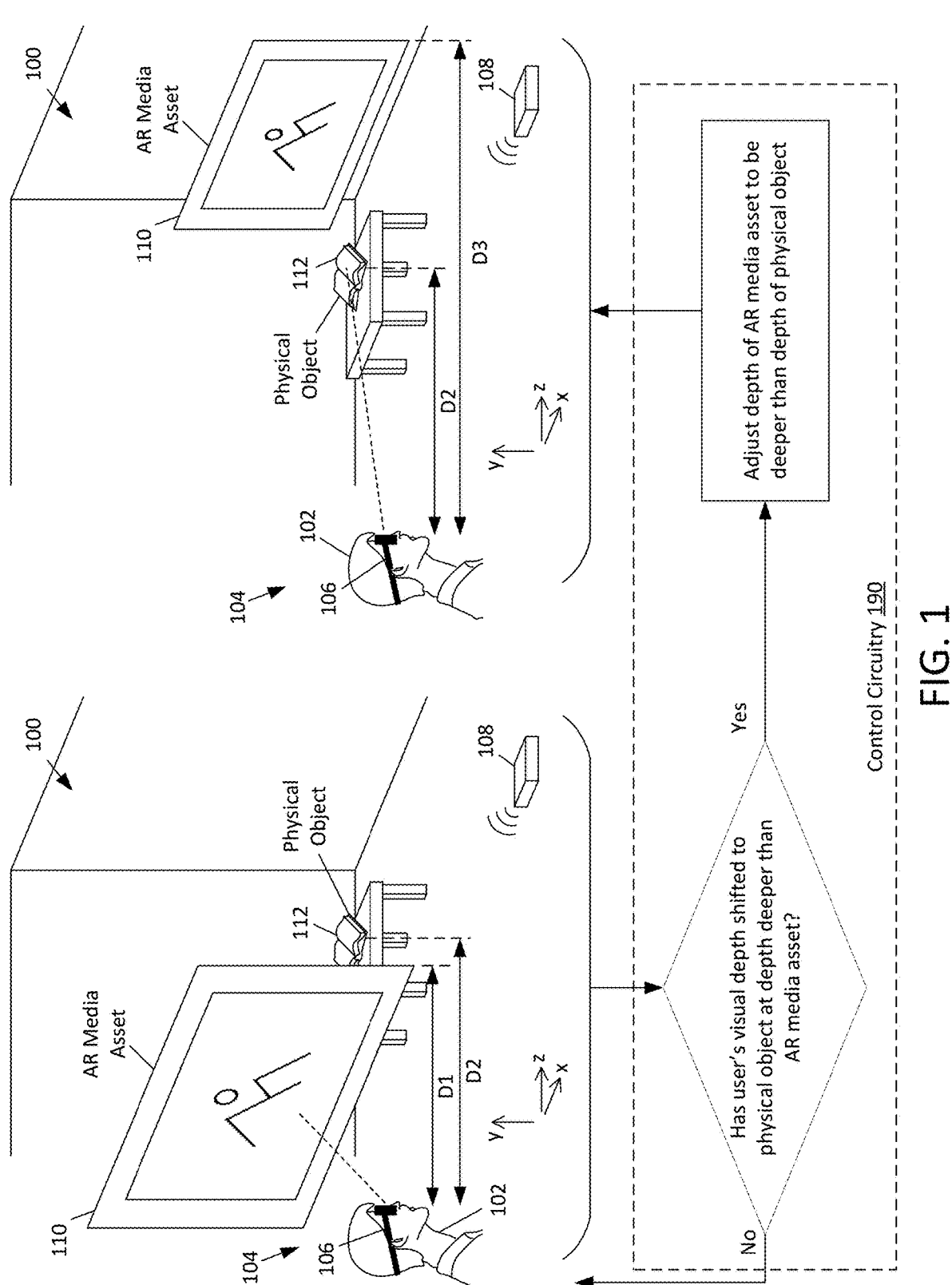
FIG. 1 shows an illustrative diagram of positioning an AR media asset to a different depth, in accordance with some embodiments of this disclosure.

As referred to herein, the phrase "augmented reality" refers to any kind of display of a media asset, or digitally or optically produced content, that overlays a real-world environment. For example, augmented reality (AR) may be provided using goggles or glasses worn by a user. That is, the goggles may allow the user to partially see the real world, while some digitally produced content is overlaid, by the goggles, over the real-world objects to create a mixed reality. The media asset may be referred to as an AR media asset when displayed by an AR device. In some embodiments, AR may also refer to holographic projection of the AR media asset that overlays real-world objects or is projected in the real world. Extended reality devices are also contemplated, and include AR devices, mixed reality devices, and virtual reality devices that enable virtual objects to augment the physical environment in a "passthrough" mode.

As referred to herein, the phrase "physical environment" refers to any kind of physical area, where display of an AR media asset may be viewed by one or more users, and physical areas that immediately adjoin such areas. For example, if an AR media asset is projected (e.g., on a display of an AR device) in a room, all parts of that room may be considered to be a "physical environment." In some embodiments, such physical environments may include areas where the AR media asset is not visible and areas not in a field of view of a user or AR device. For example, areas behind or to the side of the projected AR media asset can still be considered within the "physical environment."

As referred to herein, the phrase "display" refers to any device or devices to display the AR media asset on a head-mounted display (HMD), such as an AR device. The display includes virtual displays and anything capable of generating and displaying an image and/or video from an input to a user of the AR device. A virtual display is anything that is generated by an extended reality device, such as an AR device, for displaying an image and/or video from an input. The input may, for example, be a media asset stream wirelessly received at a radio and/or receiver of the extended reality device. A virtual display may comprise solely the output generated from a media asset, for example, a borderless video projected onto the physical world. In another example, a virtual display may comprise one or more virtual elements to make the virtual display appear in a similar manner to a traditional display, such as a television (TV). The term "physical display" includes the screens of devices such as televisions, computer monitors, tablets, and smartphones, to name a few examples. Other physical displays may include a projector and projection surface or a holographic display.

Manipulating a state of an AR media asset includes changing anything that relates to the playing of the AR media asset. For example, the state of an AR media asset may be manipulated from a "play" state to a "time shift" state, a "pause" state, a "fast-forward" state, a "rewind" state, and/or a "play half speed" state, or any combination of these different states, to name a few examples. Manipulating the quality of an AR media asset includes requesting a different resolution or changing the resolution and/or bitrate of an AR media asset, and/or one or more segments or fragments of an AR media asset, and/or the size of a spatial screen or display of the AR device.

In adaptive bitrate video streaming, the manifest file for the media asset includes a list of segments as well as their location so that the player is able to fetch (e.g., by issuing HTTP GET requests). The encodings of the content at the various resolutions or renditions (e.g., 1080p) are also available so that the player can adapt and request the appropriate rendition based on the available bandwidth.

In one embodiment, the resolution of the segment requested configures the size of the spatial display. Since frequently changing the size of the spatial display or screen can impact the viewer's experience negatively, the screen size may be changed (e.g., downsized) in response to repetitive buffering or in response to the available bandwidth not supporting future requests of segments at a higher bitrate.

Users may use a media guidance interface that allows them to efficiently navigate content selections and easily identify content that they may desire to view. The media guidance interface may be used by users to manipulate a state of an AR media asset. For example, a user may use the guidance interface to select a movie and to control the playing of the movie. The media guidance interface is presented to the user using the AR device. An application that provides such guidance is referred to herein as an interactive media guidance application or, sometimes, a media guidance application or a guidance application.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "media equipment device," or "media device" should be understood to mean any device for accessing the content described above, such as a TV, a Smart TV, a set-top box, an integrated receiver decoder (IRD) for handling satellite TV, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer TV (PC/TV), a PC media server, a PC media center, a hand-held computer, a stationary telephone, a personal digital assistant (PDA), a mobile telephone, a portable video player, a portable music player, a portable gaming machine, a smart phone, or any other TV equipment, computing equipment, or wireless device, and/or combination of the same. In some embodiments, the user equipment device may have a camera.

On these user equipment devices, users may be able to navigate among and locate the same content available through a TV. Consequently, media guidance may be available on these devices, as well. The guidance provided may be for content available only through a TV, for content available only through one or more of other types of user equipment devices, or for content available both through a TV and one or more of the other types of user equipment devices. The media guidance applications may be provided as online applications (i.e., provided on a website, or as stand-alone applications or clients on user equipment devices. Various devices and platforms that may implement media guidance applications are described in more detail below.

FIG. 1 shows an illustrative diagram of positioning an AR media asset 110 to a different depth, in accordance with some embodiments of this disclosure.

A media system 104 generates the AR media asset 110, which is a media asset projected by an AR device 106, for display in a three-dimensional (3D) environment 100. The media system 104 allows a user 102 to focus on a surrounding physical environment while consuming, or viewing, the AR media asset 110. For example, the media system 104 may be used in combination with the methods below to automatically position or modify the AR media asset 110 to allow the user 102 to focus on a physical object 112 in the 3D environment 100.

The media system 104 includes an HMD, such as the AR device 106, a media equipment device 108, and control circuitry 190. The control circuitry 190 resides in the AR device 106 and in the media equipment device 108. The media system 104 includes several applications to control the position and playing of the AR media asset 110. For example, the media system 104 processes computer-executable instructions to coordinate presentation and playing of the AR media asset 110 on a display of the AR device 106 directly from a server or provider, such as a live over-the-top (OTT) service or on-demand source, or locally, such as content resident on the media equipment device 108 by establishing connection with the media equipment device 108 (e.g., being on the same local area network (LAN)). The AR device 106 can utilize media apps installed on it to establish a media session with a media service (e.g., OTT service) to retrieve listings, enable selection of media to stream, etc., and therefore, the media equipment device 108 is not part of such arrangement.

The instructions may be provided by a media guidance application, such as described above, through input/output (I/O) circuitry, such as I/O paths 602 and 712 discussed below in relation to FIGS. 6 and 7. The media guidance application executes on the control circuitry 190 of the media equipment device 108. The media system 104 executes an eye-tracking application, such as discussed in relation to FIGS. 6 and 10, to determine where the user 102 is focused. The eye-tracking application executes on the control circuitry 190 of the AR device 106 to minimize latency. In some embodiments, the media system 104 executes a classification application, such as discussed in relation to FIG. 2A, to position the AR media asset 110. In some embodiments, the media system 104 executes a saliency application, such as discussed in relation to FIGS. 3A and 3B, to position the AR media asset 110. The classification application and saliency application execute on the control circuitry 190 of the AR device 106. In some embodiments, the media guidance application executes on the control circuitry 190 of the AR device 106. In some embodiments, any of the eye-tracking, classification, and saliency applications may execute on the control circuitry 190 of the media equipment device 108.

The 3D environment 100 includes a physical environment, depicted as a room, and an AR virtual space. The physical object 112, which is depicted as a book resting on a table, exists in the physical environment. The AR media asset 110 exists in the AR virtual space, which is overlaid on or projected onto the physical environment. The user 102 perceives the 3D environment 100, where the AR media asset 110 is projected into the physical environment. Dimensional characteristics of the physical environment are provided to the media system 104. The dimensional characteristics include the spatial location of physical objects in the physical environment, including the user 102.

The AR media asset may be a movie, television (TV) show, sports game, streaming content, photo, presentation, three-dimensional (3D) content, or video game, to name a few examples. In some embodiments, the AR media asset is a "show," which includes movies, TV, and streaming content. The AR media asset 110 is projected or displayed at a first depth D1 in the 3D environment 100. The first depth D1 is determined in relation to the AR device 106. For example, the AR media asset 110 is presented on a display of the AR device 106. The display is a system for displaying AR content to the user. The display may comprise several components, including any of a light source, display screen, microdisplay, projector, waveguides, reflector screen, beam splitter, and combiner. The display forms an x-y plane. Depths, including the first depth D1, extend orthogonal to the display of the AR device 106 (e.g., in a z-direction). Thus, the depths may be determined in relation to the display of the AR device 106. The x-y plane and the depths move (e.g., left, right, up, down, or swivel) with the AR device 106. In the embodiment depicted in FIG. 1, the x, y, and z directions are shown for reference and do not imply a coordinate system.

The media system 104 uses an eye-tracking system to determine where, in the 3D environment, a gaze of the user 102 is focused. The eye-tracking system includes a camera and emitters for each eye and the eye-tracking application to process the images captured by the cameras. The illuminators, which may emit infrared or near-infrared light, create a pattern of light reflections on the eyes of the user 102. The cameras capture images of the eyes and the pattern of light reflections as a user interface input. The eye-tracking application, which may use a trained machine learning model (e.g., a convolutional neural network), uses the captured images to track each eye using the patterns, and to determine a location in the 3D environment 100 where the gaze of the user 102 is focused (e.g., a focal point). The focal point may be determined by projecting a vector orthogonal from the pupil of each eye. The focal point is a point in the 3D environment where the vectors (referred to as eye gaze vectors) intersect. In some embodiments, the eye-tracking system may include at least one camera to capture images of the field of view of the user 102. The preceding is only one example of an eye-tracking method and system. Other eye-tracking methods and systems known to one skilled in the art are also contemplated.

Different types of eye movements include physiological nystagmus, fixations, saccadic movements including microsaccades, post-saccadic oscillations, glissades, smooth pursuit movements. The types of eye movements are used to determine if the user 102 is focused on something in the 3D environment 100 and where, in the 3D environment 100, the gaze of the user 102 is focused. For example, the user 102 may have a fixation or smooth pursuit type of eye movement when focusing on the physical object 112 or on the AR media asset 110. Vergence may be used to determine the depth at which the user is focused. Vergence is the movement of one eye in relation to the other. When focusing on object positioned further away, the eyes rotate away from one another. When focusing on an object positioned closer by, the eyes rotate toward one another. An angle of vergence is formed when both eyes focus on a point in space. The angle of vergence may be used to determine the depth at which the user is focused.

The media system 104 uses the dimensional characteristics of the physical environment with the focal point determined by the eye-tracking system to determine a depth of the gaze of the user. In some embodiments, the media system 104 uses the images of the field of view with the dimensional characteristics to determine the position of the user 102 in the 3D environment 100 and/or to determine where the gaze of the user 102 is focused. The media system 104 determines if the user's visual depth has shifted to a second depth D2 that is deeper than the first depth D1 of the AR media asset 110. If focused on the second depth D2, then it is likely that the user is focused on an object in the physical environment (e.g., physical object 112) and not the AR media asset 110.

In the embodiment depicted in FIG. 1, the control circuitry 190 determines that the gaze of the user 102 moves from the AR media asset 110 to the physical object 112. The AR media asset 110 is projected at a known depth (e.g., the first depth D1). The media system 104 determines a depth of the physical object 112 (e.g., a second depth D2), which is deeper, and greater, than the depth of the AR media asset 110. The AR media asset 110 is also positioned such that it at least partially overlays the physical object 112 from the user's perspective. In response to determining the gaze of the user 102 is focused at the second depth D2, the control circuitry 190 adjusts a depth of the AR media asset 110 to be deeper than the second depth D2 of the physical object 112 and positions the AR media asset 110 at a third depth D3. Moving the AR media asset 110 to the third depth D3 allows the user 102 to pay attention to the physical object 112. In some embodiments, the AR media asset 110 is adjusted when repositioned to the third depth D3. For example, a notification may be presented to the user 102 or the AR media asset 110 may be paused or hidden, such as discussed below in relation to FIGS. 9A-9C. In such examples, the notification may be removed, or playing of the AR media asset 110 may be resumed when the gaze of the user is focused at the third depth D3. In another example, the display size of the AR media asset 110 may be reduced.

In some embodiments, a screen depth error threshold is used to determine if the second depth D2 is greater than the first depth D1. For example, the difference between the first and second depths D1 and D2 may be determined. The second depth D2 is considered greater than the first depth D1 if the second depth D2 is greater than the first depth D1 (e.g., D2>D1) and the difference between the two is outside of the screen depth error threshold (e.g., (D2–D1)>screen depth error threshold). The screen depth error threshold may be used to ensure the user has focused on an object in the physical environment and not the AR media asset 110. The screen depth error threshold may also be used to account for any sensor or measurement error in the first and second depths D1 and D2 and to prevent unnecessary movement of the AR media asset 110. The screen depth error threshold may be at 1 inch, such as at least 3 inches, such as at least 6 inches, such as at least 1 foot, such as at least 3 feet.

In the depicted embodiment, the depths are referenced from the AR device 106. If the user 102 swivels his or her head left or right, the AR device 106 and the AR media asset 110 swivel accordingly. The depth of the physical object 112 changes as the AR device 106 moves since the depth to the physical object 112 in the z-direction changes. In some embodiments, the depth of the physical object 112 is measured continuously, such as multiple times per second. In such embodiments, a depth of the AR media asset 110 is adjusted as the depth of the physical object 112 is updated (e.g., if the physical object moves). In some embodiments, the depth of the AR media asset 110 may be adjusted if the user 102 focuses on the physical object 112 for a period of time greater than an attention threshold. The attention threshold may be at least 0.5 seconds, such as at least 1 second, such as at least 1.5 seconds, such as at least 2 seconds, such as at least 3 seconds. The period of time may be determined using discrete time slots, such as time slots of at least 2 seconds, such as at least 3 seconds, such as at least 5 seconds, such as at least 7 seconds, such as at least 10 seconds.

In some embodiments, the depth of the AR media asset 110 may be adjusted if the user 102 returns focus on the AR media asset 110 from the physical object 112. For example, if the AR media asset 110 is positioned at the third depth D3 and the gaze of the user 102 is on the AR media asset 110 for the attention threshold, then the media system 104 repositions the AR media asset 110 at the first depth D1.

In some embodiments, the AR media asset 110 may be moved left or right in the 3D environment 100. For example, the AR media asset 110 may be moved in the x-direction and/or the y-direction. In such embodiments, if the AR media asset 110 is projected over the physical object 112, and user 102 is focused at the second depth D2 of the physical object 112, then the AR media asset 110 is moved in the x-direction and/or the y-direction such that the AR media asset is no longer projected over the physical object 112.

In some embodiments, the AR media asset 110 is paused if the gaze of the user is focused on an object in the 3D environment other than the AR media asset 110 (e.g., in the physical environment), such as focused on the physical object 112 at the second depth D2. In some embodiments, a thumbnail icon is displayed if the gaze of the user is focused on an object in the 3D environment other than the AR media asset 110, such as an image from the AR media asset 110. In some embodiments, a paused indicator is displayed if the gaze of the user is focused on an object in the 3D environment other than the AR media asset 110, such as the word "paused" or the pause icon.

In some embodiments, the physical object 112 may instead be a virtual object that exists in the AR virtual space. For example, the virtual object may be a book that is projected by the AR device 106 into the physical environment at the second depth D2. In some embodiments, the media system 104 determines the user is focused on the virtual object and moves the AR media asset 110 to the third distance D3.

In some embodiments, the focus of the user 102 is determined without the eye-tracking system. In some embodiments, the media system 104 determines the user 102 is focused on the physical object 112 through a user input. In some embodiments, the user input is received through a user interface input from a peripheral device. The user 102 uses the peripheral device to select the physical object 112 as the object of focus using a cursor. In some embodiments, the user input is the user's voice. The user 102 may speak a word, phrase, or utterance to select the physical object 112 as the object of focus. In some embodiments, the media system 104 analyzes the user's voice or conversations to determine the user 102 is focused on the physical object 112. For example, the user 102 may discuss the physical object 112 or the characteristics of the physical object 112 without expressly telling the media system 104 to focus on the physical object 112. In some embodiments, the media system 104 determines the direction of received audio in the physical environment. The received audio may be used to determine a physical object is the object of focus.

Figure 2A:
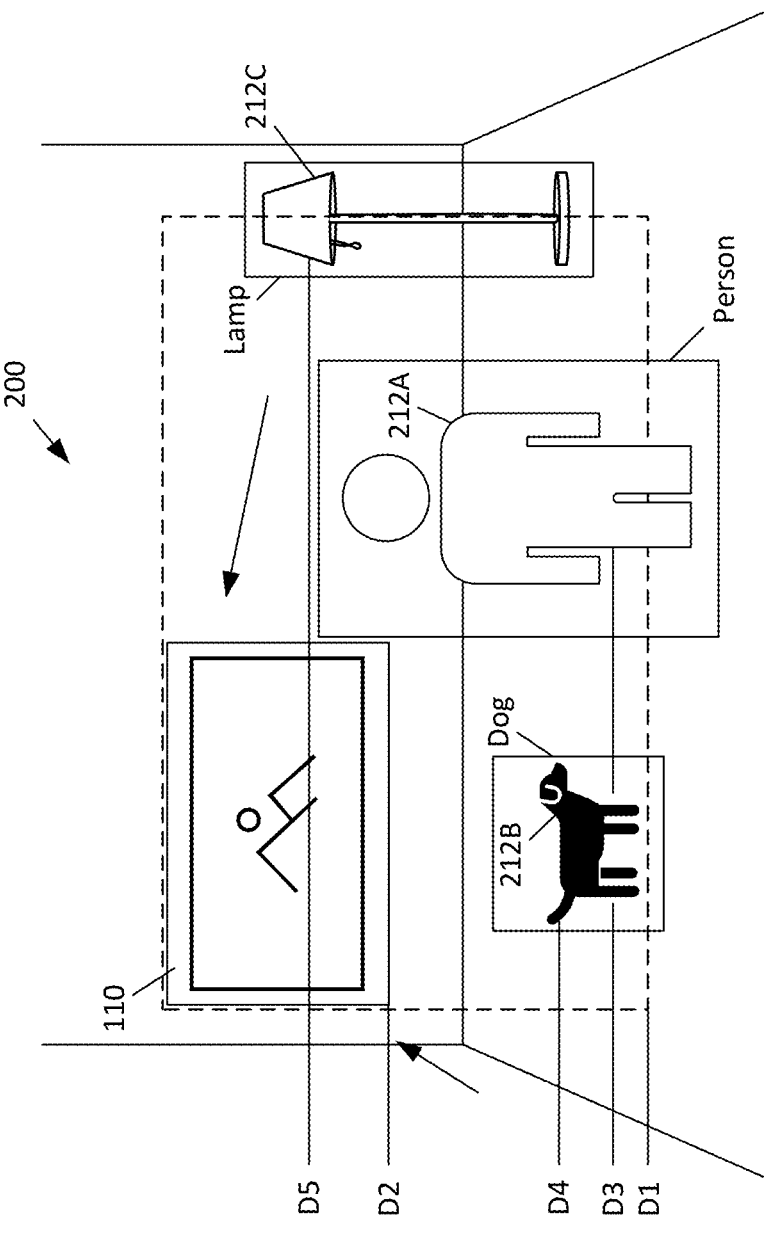
FIG. 2A shows an illustrative diagram of repositioning an AR media asset to a different depth, in accordance with some embodiments of this disclosure.
Figure 2B:
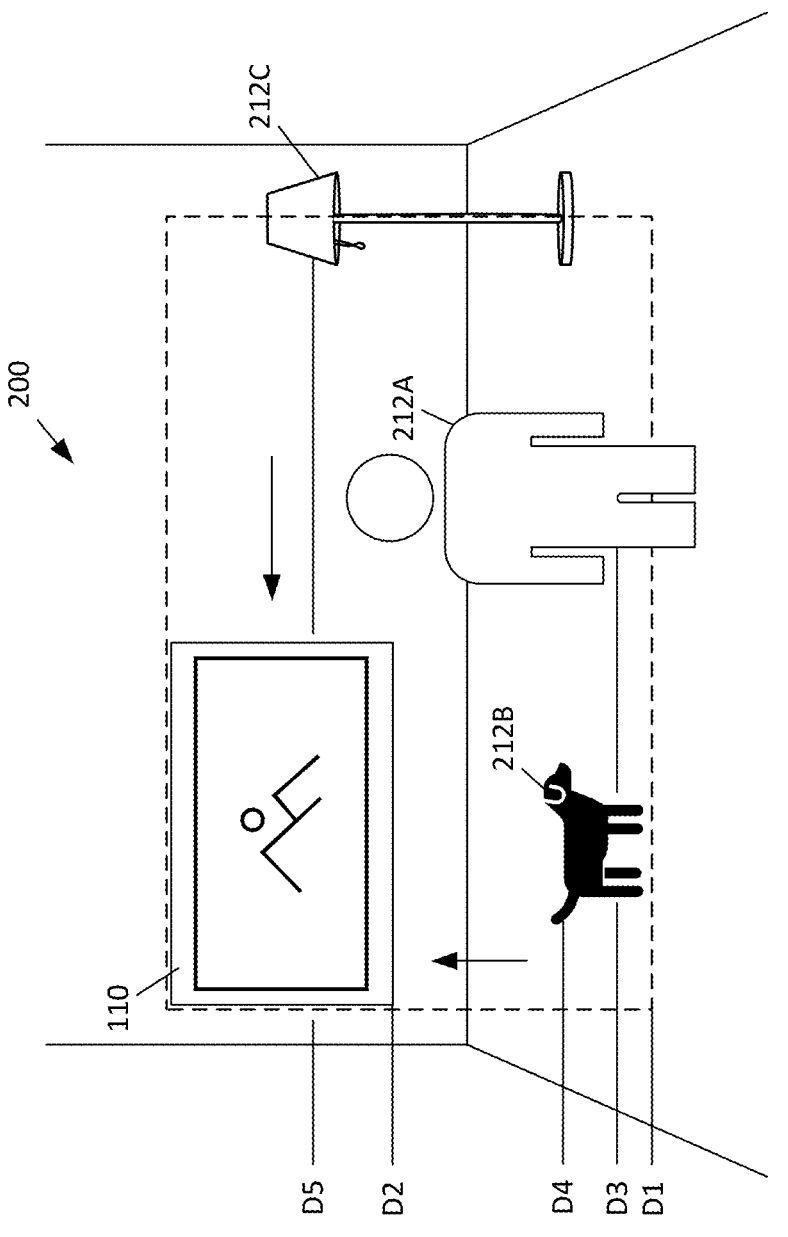
FIG. 2B shows an illustrative diagram of resizing an AR media asset, in accordance with some embodiments of this disclosure.

In some embodiments, a classification system may be used to determine the user 102 is focused on the physical object, such as discussed in relation to FIGS. 2A and 2B. The classification system identifies the physical object 112 as a book and determines the user 102 is likely to focus on the book. In some embodiments, a saliency map of the physical environment may be used to determine the user 102 is focused on the physical object 112, such as discussed in relation to FIGS. 3A and 3B. The saliency map highlights regions of the physical environment that stand out. The saliency map identifies the physical object 112 as likely to stand out. The classification system and the saliency map may be used to verify or complement any of the previously discussed means of determining the user is focused on the physical object 112.

In some embodiments, the media system 104 does not include the media equipment device 108. In such embodiments, the control circuitry 190 of the AR device 106 may perform the tasks or operations of the control circuitry 190 of the media equipment device 108 previously discussed. In some embodiments, the media guidance application resides on the AR device 106, and the AR device 106 processes the computer-executable instructions to coordinate the presentation and playing of the AR media asset 110. The AR device 106 retrieves the AR media asset 110, either from a server or provider or from local storage of the AR device 106.

In some embodiments, the media system 104 determines depths using one or more position sensors. The position sensors may be used to determine the dimensional characteristics of the physical environment. For example, the media system 104 may determine the position of the user 102 and/or the AR device 106 in relation to the physical object 112, such as the distance and angle from the user 102 to the physical object 112. The position sensor may determine bounds of the physical environment, such as walls, doors, and openings. In some embodiments, the position sensor is part of the AR device 106. In some embodiments, the position sensor includes a transceiver that sends data to and receives data from a transceiver of the AR device 106 through radio waves. In some embodiments, data is sent in short nanosecond pulses over a range of frequencies, such between 3.1 to 10.6 GHz. The time to send and receive the data is used to calculate the position of the AR device 106, which may also be considered the position of the user 102. In some embodiments, a transceiver may be worn by the user (e.g., not part of the AR device 106). In some embodiments, one or more transceivers may be held by the user 102 (e.g., as part of a remote or AR controller) or attached to different locations on the user 102 (e.g., chest, back, legs, arms, hands, and feet). The one or more transceivers may be used to determine the position of the user 102 or position of appendages and limbs of the user 102. In some embodiments, the position sensor may communicate with transceivers coupled to portions of the physical environment (e.g., walls, a floor, a ceiling, or corners) or objects in the physical environment to determine bounds of the physical environment and map the objects within the physical environment. Different techniques may be used with the data to determine the positions, such as time difference of arrival (TDoA), two-way ranging (TWR), angle of arrival (AoA), and phase-difference-of-arrival (PDoA), to name a few examples. In some embodiments, the transceivers are ultra-wideband (UWB) radio transceivers. In some embodiments, the transceivers may use chirp spread spectrum (CSS), Bluetooth® or Bluetooth® low energy (BLE), or Wi-Fi to communicate with one another. In some embodiments, the user 102 may input locations of fixed objects, such as the bounds of the physical environment and objects in the physical environment, to the media system 104.

In some embodiments, the x-y plane is formed by other parts of the AR device 106, such as positional sensors. In some embodiments, the x-y plane is formed by features of the user 102, such as facial features. In some embodiments, the x-y plane may be determined in relation to the physical environment. For example, a wall behind the user may form the x-y plane and the z-direction extends outward and orthogonal from the wall. In such embodiments, the AR media asset 110 may not move with the AR device 106 and instead remain anchored to the 3D environment 100. For example, the AR media asset 110 may be anchored to a position in the 3D environment having a low visual saliency, such as discussed below in relation to FIGS. 3A and 3B.

FIGS. 2A and 2B show illustrative diagrams of repositioning the AR media asset 110, in accordance with some embodiments of this disclosure. In the embodiments depicted, the first, second, and third depths D1, D2, and D3 may be different depths than the first, second, and third depths D1, D2, and D3 depicted in the embodiment of FIG. 1.

FIG. 2A shows an illustrative diagram of repositioning the AR media asset 110 to a different depth, in accordance with some embodiments of this disclosure. In particular, FIG. 2A shows the AR media asset 110, from the perspective (e.g., a field of view) of a user (e.g., the user 102 in FIG. 1), positioned from a first depth D1 to a second depth D2.

The AR media asset 110 is placed in a 3D environment 200. The 3D environment includes a physical environment, shown as a room, and an AR virtual space. A media system (e.g., the media system 104 in FIG. 1) generates the AR media asset 110 for display by an AR device (e.g., the AR device 106 in FIG. 1) in the 3D environment 200 at the first depth D1. The media system classifies physical objects in the physical environment. For example, a classification application may determine what physical objects are in the image using the image of the physical environment as an input. The classification application may use a trained machine learning model, such as a deep learning model (e.g., a convolutional neural network (CNN)), to classify the physical objects. In some embodiments, one of the following algorithms is used to detect and classify the physical objects: you only look once (YOLO), regions with convolutional neural networks (R-CNN), fast R-CNN, faster R-CNN, and single-shot detector (SSD).

In the embodiment depicted in FIG. 2A, the physical environment includes several physical objects, including a first physical object 212A, a second physical object 212B, and a third physical object 212C. The media system classifies physical objects 212A-C as a person, dog, and lamp, respectively, although other embodiments may use different classifications (e.g., animal, light, furnishing, mobile, non-mobile, close, and far). The media system surrounds each of the physical objects 212A-C in the image with a rectangular boundary. The rectangular boundary may be used as bounds for determining what physical object is located within the rectangular boundary. In some embodiments, the rectangular boundary is presented to the user through the display of the AR device. In some embodiments, the rectangular boundary is not presented to the user.

Certain classifications are categorized as interactive, such as physical objects that the user may interact with, while the remainder of the classifications are categorized as passive, such as physical objects that the user does not interact with. The AR media asset 110 is positioned at a depth that is deeper than the interactive physical objects. The first physical object 212A and the second physical object 212B are interactive and positioned at a third depth D3 and fourth depth D4, respectively. The AR media asset 110 is moved to the second depth D2, which is deeper than the third and fourth depths D3 and D4 of the interactive first and the second physical objects 212A and 212B. The third physical object 212C is not considered when positioning the AR media asset 110 because it is passive.

Figure 7:
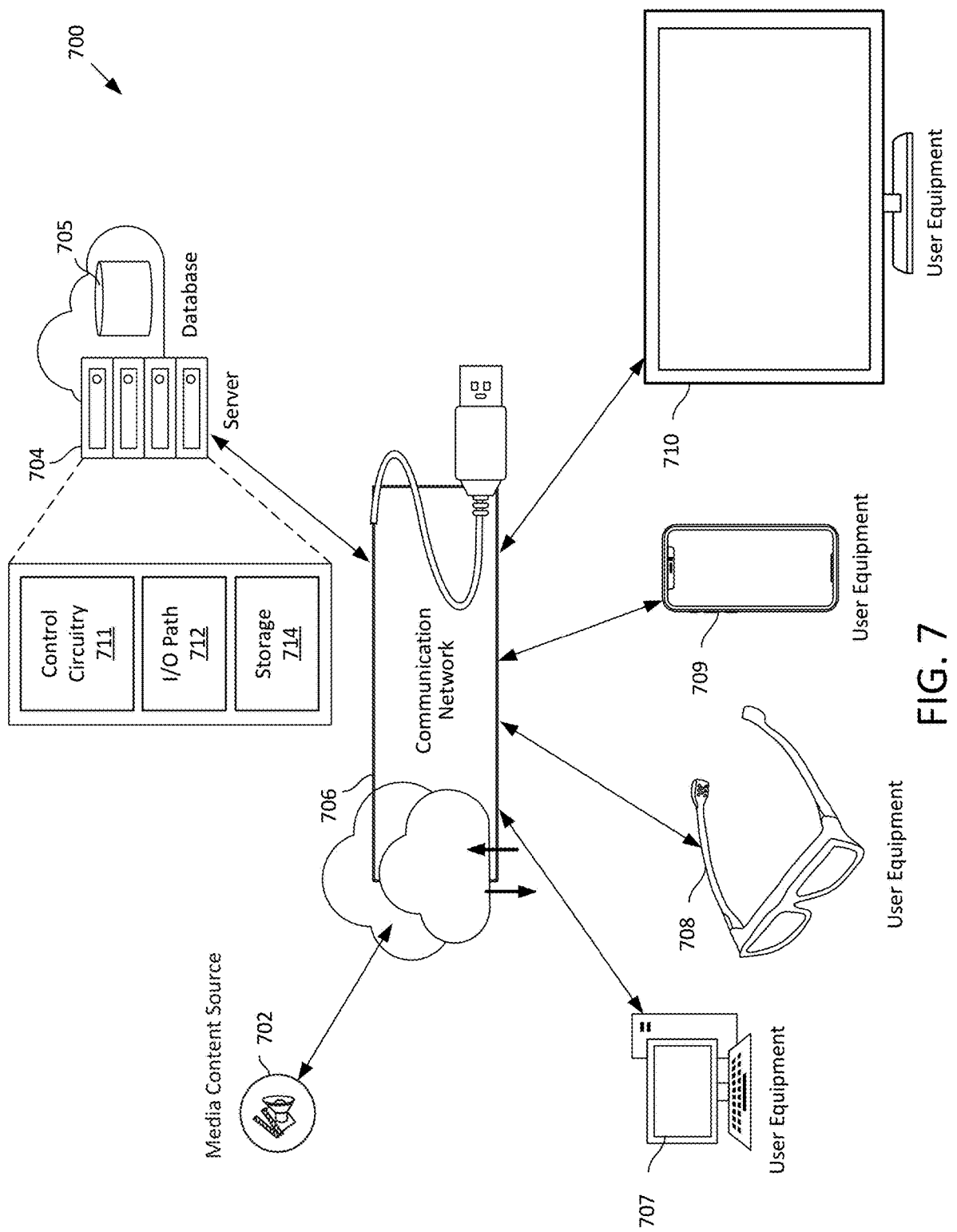
FIG. 7 shows illustrative systems, in accordance with some embodiments of this disclosure.

In some embodiments, a database, such as a database 705 discussed below in relation to FIG. 7, is referenced to determine the category of the classifications. For example, the media system may look up the classifications "person," "dog," and "lamp" in the database to determine their categories are interactive, interactive, and passive, respectively.

In some embodiments, the media system determines the gaze of the user is focused on one of the first, second, or third physical objects 212A, 212B, or 212C. If the user's gaze is focused on a interactive physical object (e.g., the first physical object 212A or second physical object 212B), then the AR media asset 110 is moved to a deeper depth. But if the user's gaze is focused elsewhere, such as on a passive physical object or an unclassified physical object, the AR media asset 110 remains at the same depth.

In some embodiments, the AR media asset 110 is not generated for display at the first depth D1. In such embodiments, the gaze of the user is first determined and then the AR media asset 110 is generated for display at an appropriate depth as discussed above.

FIG. 2B shows an illustrative diagram of resizing the AR media asset 110, in accordance with some embodiments of this disclosure.

The AR media asset 110 may be resized and/or repositioned in response to any of the scenarios discussed in relation to FIGS. 1 and 2A. The AR media asset 110 is resized and/or positioned such that the AR media asset 110 appears unobstructed to the user. For example, in the embodiment depicted in FIG. 1, the AR media asset 110 at the third depth D3 does not overlay the physical object 112. In the embodiment depicted in FIG. 2A, the AR media asset 110 does not overlay the interactive first and second physical objects 212A and 212B. In the embodiment depicted in FIG. 2B, the AR media asset 110 remains in the same x-y plane when it is resized and/or repositioned. Although in some embodiments, the depth of the AR media asset 110 may be adjusted in addition to the size and/or position.

Figure 3B:
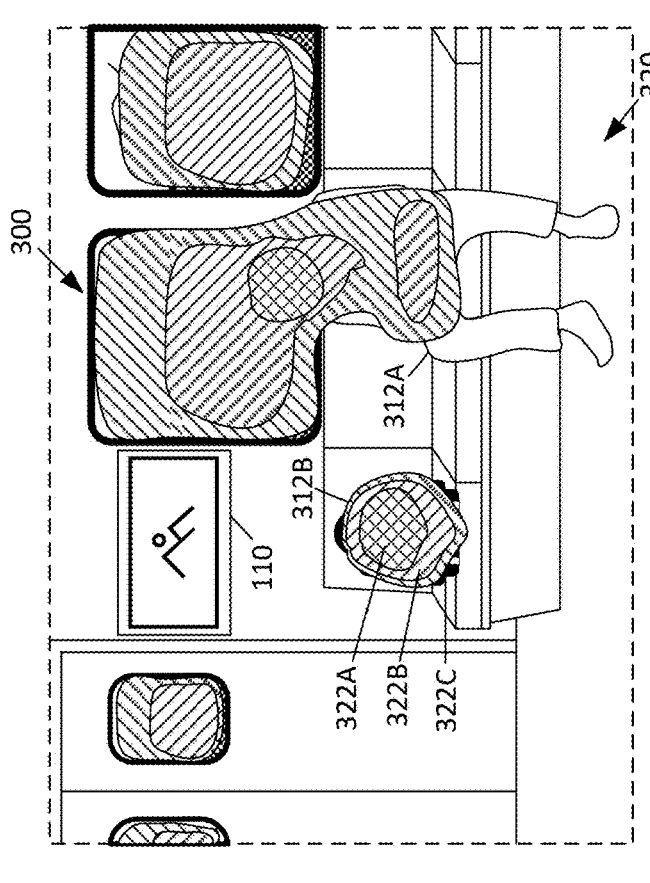
FIG. 3B shows an illustrative diagram of a saliency map of the three-dimensional environment of FIG. 3A, in accordance with some embodiments of this disclosure.
Figure 3A:
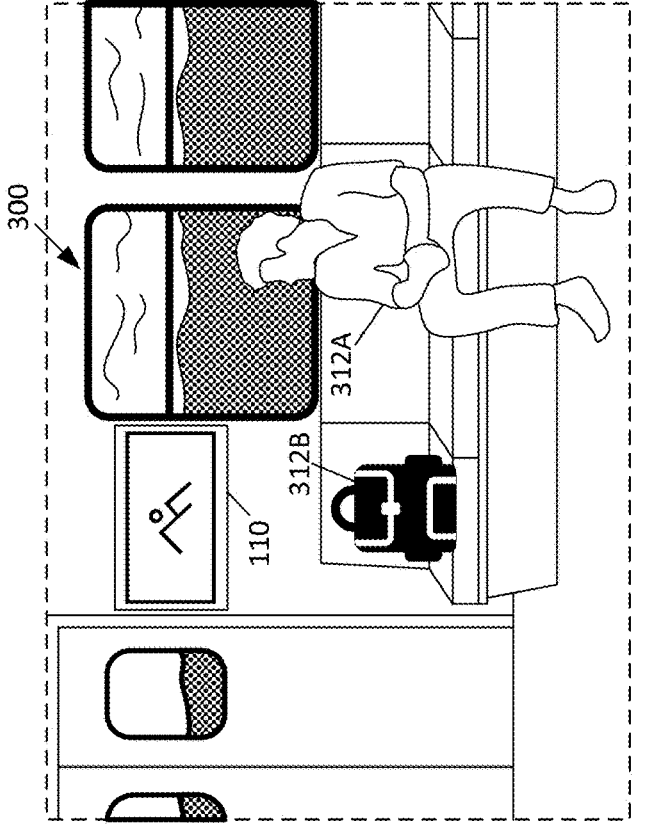
FIG. 3A shows an illustrative diagram of an AR media asset displayed in a three-dimensional environment, in accordance with some embodiments of this disclosure.

FIG. 3A shows an illustrative diagram of the AR media asset 110 displayed in a three-dimensional environment 300, in accordance with some embodiments of this disclosure. FIG. 3B shows an illustrative diagram of a saliency map of the three-dimensional environment 300 of FIG. 3A, in accordance with some embodiments of this disclosure. Therefore, FIGS. 3A and 3B are herein described together for clarity.

The 3D environment 300 includes a physical environment and an AR virtual space, and is shown from the perspective of a user (e.g., user 102 in FIG. 1). The physical environment includes a public transportation vehicle, such as a subway, train, or trolley. A saliency map 320 of the physical environment highlights regions of the physical environment that stand out. The saliency map 320 highlights regions of the physical environment that stand out. The saliency map 320 is used to determine if the user is likely to focus on a physical object in the physical environment. The saliency map 320 includes three region types, which may correlate to what the gaze of the user is expected to focus on. A first region 322A stands out the most. A second region 322B stands out less than the first region 322A and surrounds the first region 322A. A third region 322C stands out less than the second region 322C, but more than the remainder of the physical environment, and surrounds the second region. Some regions may only include the third region 322C or the second and third regions 322B and 322C (i.e., no first region 322A). The saliency map 320 is a listing of saliency values, or weights, for the physical environment. In some embodiments, the saliency values range from 0 to 1, where 0 is the least important (e.g., does not stand out or the user is not expected to focus on) and 1 is the most important (e.g., stands out and the user is expected to focus on). The saliency values represent a likelihood or probability of the corresponding portion of the physical environment being visually salient. The saliency values may correspond to the first, second, and third regions 322A, 322B, and 322C.

The saliency map 320 is used to position the AR media asset 110. In the embodiment depicted in FIG. 3B, the first and second regions 322A and 322B highlight the windows of a public transportation vehicle on which the user is sitting inside. The nearby, outside landscape, which appears to move fast, is in the second region 322A and the sky, which appears to move less in relation to the outside landscape, is in the third region 322C. A face of a passenger 312A and a portion of a backpack 312B are each in first regions 322A and other portions of the passenger 312A and backpack 312B are in the second and third regions 322B and 322C. The AR media asset 110 is positioned outside of the first, second, and third regions 322A, 322B, and 322C since these all may correspond to regions on which the gaze of the user may focus.

The AR media asset 110 is positioned in an area of the 3D environment corresponding to an area of the of the physical environment where the saliency values are below a saliency threshold. The saliency threshold may be a saliency value at least 30% of the maximum saliency value (e.g., 1), such as at least 30% of the maximum saliency value, such as at least 50% of the maximum saliency value, such as at least 70% of the maximum saliency value, such as at least 85% of the maximum saliency value.

The saliency map 320 may be generated from an image or a video (e.g., a sequential series of images) of the physical environment. For example, a saliency application may use the image or video as an input to a trained machine learning model (e.g., a convolutional neural network) to determine the first, second, and third regions 322A, 322B, and 322C. In some embodiments, a media system (e.g., the media system 104 in FIG. 1) generates the saliency map 320.

Figure 4:
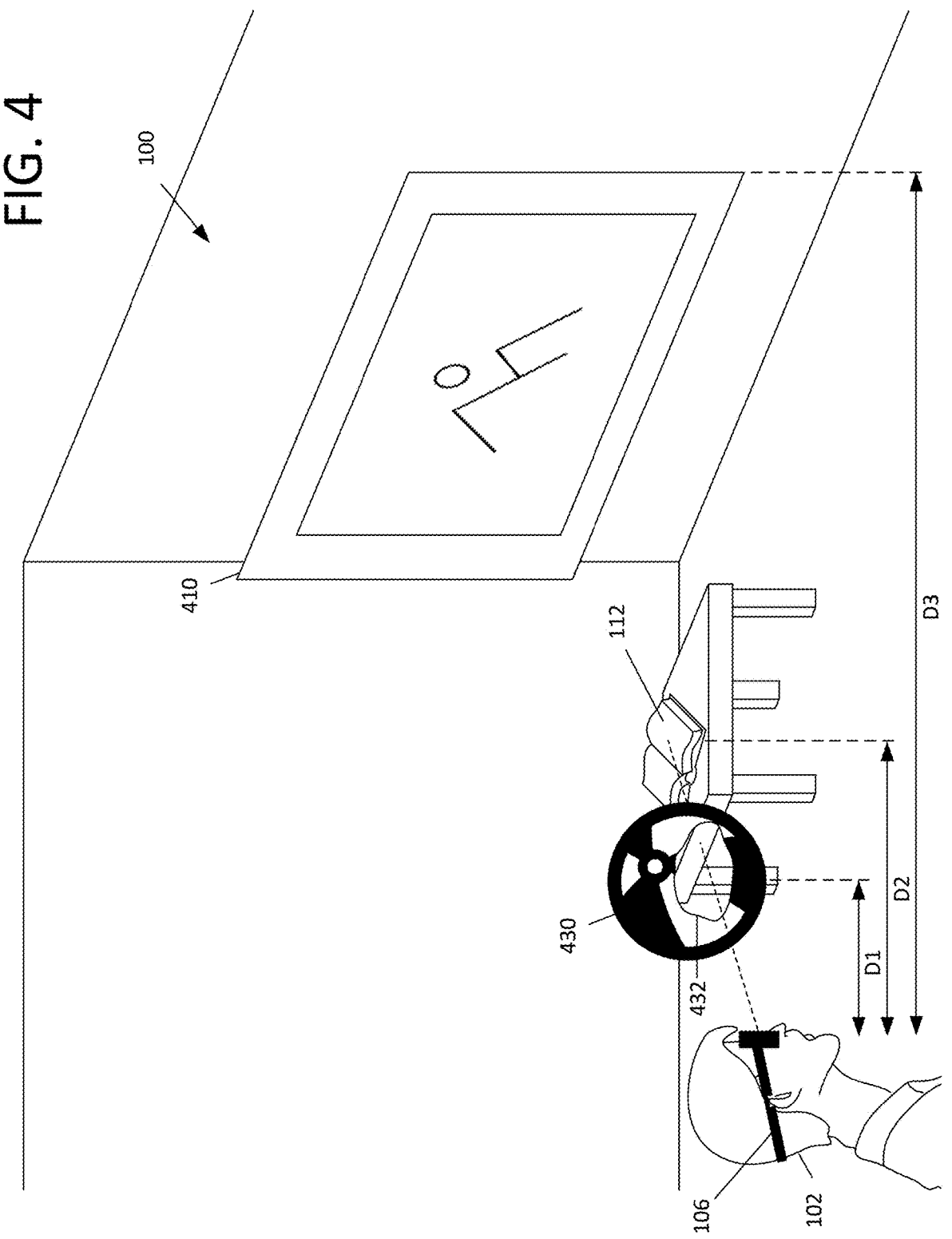
FIG. 4 shows an illustrative diagram of adjusting transparency of an AR media asset, in accordance with some embodiments of this disclosure.

FIG. 4 shows an illustrative diagram of adjusting transparency of an AR media asset (e.g., a second AR media asset 430), in accordance with some embodiments of this disclosure. The first, second, and third depths D1, D2, and D3 may be different depths than the first, second, and third depths D1, D2, and D3 depicted in the embodiments of FIGS. 1, 2A, and 2B.

A first AR media asset 410 is positioned in the 3D environment 100 at a third depth D3 from the user 102. The physical object 112 is positioned at a second depth D2 that is less than the third depth D3. The second AR media asset 430 is positioned at a first depth D3 that is less than the second depth D2. In the depicted embodiment, the first AR media asset 410 is a movie and the second AR media asset 430 is supplemental AR content that complements a current scene in the movie, providing the user 102 with an immersive experience. For example, if a first AR media asset is a sporting event, the second AR media asset may be images of or relevant statistics about participants in the event. If the first media asset is a movie or TV show, the second AR media asset may be images of or information about the actors, such as personal information (e.g., name, age, or height) or roles in other movies or TV shows. The supplemental AR content may also include information about the AR media asset, such as the present time point in the playing of the AR media asset, time remaining of playing of the AR media asset, and images or information about creators or owners of the content, to name a few examples.

A media system (e.g., the media system 104 in FIG. 1) determines the gaze of the user 102 is focused on the physical object 112 at the second depth D2. The second AR media asset 430, which is at least partially transparent, overlays the physical object 112 from the perspective of the user 102. The media system adjusts the transparency of a portion 432 of the second AR media asset 430 such that the user 102 can focus on the physical object 112. The transparency of the portion 432, which may be slightly larger than the physical object 112, may be adjusted to be at least 75% transparent, such as at least 80% transparent, such as at least 90% transparent, such as at least 95% transparent, such as at least 98% transparent, such as 100% transparent. When the gaze of the user 102 focuses away from the physical object 112, such as on the first AR media asset 410 or the second AR media asset 430, the media system adjusts the transparency to be the same for the entire second AR media asset 430.

In some embodiments, the transparency of each of the first and second AR media assets 410 and 430 is adjusted based on the gaze of the user 102. For example, if the user 102 is focused on the physical object 112 (e.g., at the second depth D2), then the transparency of the first and second AR media assets 410 and 430 is increased. If the user is focused on the first AR media asset 410 (e.g., at the third depth D3), then the transparency of the second AR media asset 430 is increased. If the user is focused on the second AR media asset 430 (e.g., at the first depth D1), then the transparency of the first AR media asset 410 is increased. In some embodiments, only the portion of the first and/or second AR media assets 410 and 430 that overlays an area on which the user 102 is focused is increased.

Figure 5:
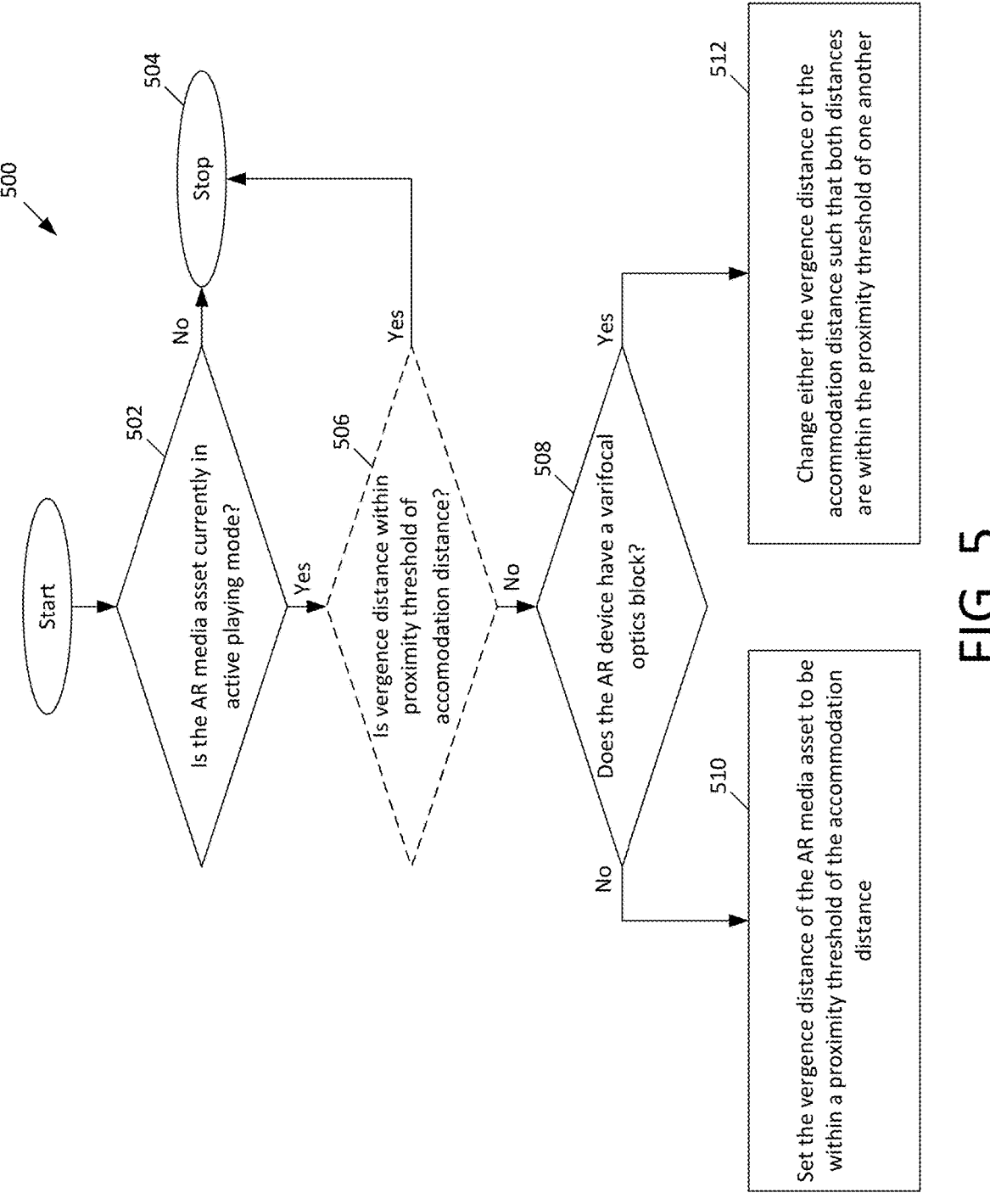
FIG. 5 is flowchart of a detailed illustrative process for adjusting an AR device to reduce a vergence-accommodation conflict, in accordance with some embodiments of this disclosure.

FIG. 5 is flowchart of a detailed illustrative process 500 for adjusting an AR device (e.g., AR device 106 in FIGS. 1 and 4) to reduce a vergence-accommodation conflict (VAC), in accordance with some embodiments of this disclosure. The VAC may occur when displaying an AR media asset (e.g., AR media asset 110, 410, and 430 in FIGS. 1-4) or adjusting a depth of the AR media asset.

The process 500 shown in FIG. 5 may be implemented, in whole or in part, by one or more systems or devices described herein.

The process 500 starts with operation 502 with a decision on whether the AR media asset is currently in active playing mode (e.g., the AR device is displaying or playing the AR media asset). If the decision is no, then the process 500 continues to operation 504 and stops.

If the decision is yes, then the process 500 continues to optional operation 506 with a decision on whether the vergence distance to an image (e.g., AR media asset) is within a proximity threshold of the accommodation distance to a virtual image (e.g., of the same AR media asset) that is formed by an optics block of the AR device (e.g., several feet or yards away).

The vergence distance may change based on the depth at which the AR device presents the AR media asset. The AR media asset is a stereoscopic image that is a combination of an image presented to each eye, such that the AR media asset can be perceived at different depths (e.g., as the AR device projects an image that is closer to the user's eyes the angle of vergence between the two eyes to view that image is increased). Thus, the vergence distance is a distance to a stereoscopic projection produced through image transforms for each eye.

The accommodation distance is the optical distance to the virtual image created by the AR device. The optical distance is based on the optics block of the AR device, which is an optical arrangement of projectors, lenses, displays, etc. The accommodation distance is a measure of the accommodation of the eyes of the user to view the virtual image. When the vergence distance and the accommodation distance are outside of the proximity threshold from one another there is a VAC, which may cause symptoms in the user such as headache, fatigue, dizziness, nausea, or eye strain. The proximity threshold is a range where the user does not experience the symptoms after using the AR device for an extended period of time, such as for at least 30 minutes, such as for at least 1 hour, such as for at least 2 hours, such as for at least 3 hours.

The vergence distance changes when the AR media asset is repositioned, such as from a first depth to a second depth as discussed in relation to FIG. 1. A VAC may result from the change in vergence distance. At least one of the vergence distance and the accommodation distance may be updated to mitigate the VAC.

If the decision at operation 506 is yes, then the process 500 stops at operation 504. The process 500 may be repeated at a later time with operation 502. In some embodiments, the process 500 is repeated in fixed intervals (e.g., at certain frequencies). In some embodiments, the process 500 is repeated when the depth of the AR media asset is changed.

If the decision at operation 506 is no, then the process 500 continues to operation 508 with a decision on whether the AR device has a varifocal optics block.

If the decision at operation 508 is no, then the process 500 continues to operation 510 with setting the vergence distance of the AR media asset to be within the proximity threshold of the accommodation distance.

If the decision at operation 508 is yes, then the process 500 continues to operation 512 with changing either the vergence distance (e.g., through image transforms for each eye) or the accommodation distance (e.g., through changing focal length) such that both distances are within the proximity threshold of one another.

Figure 6:
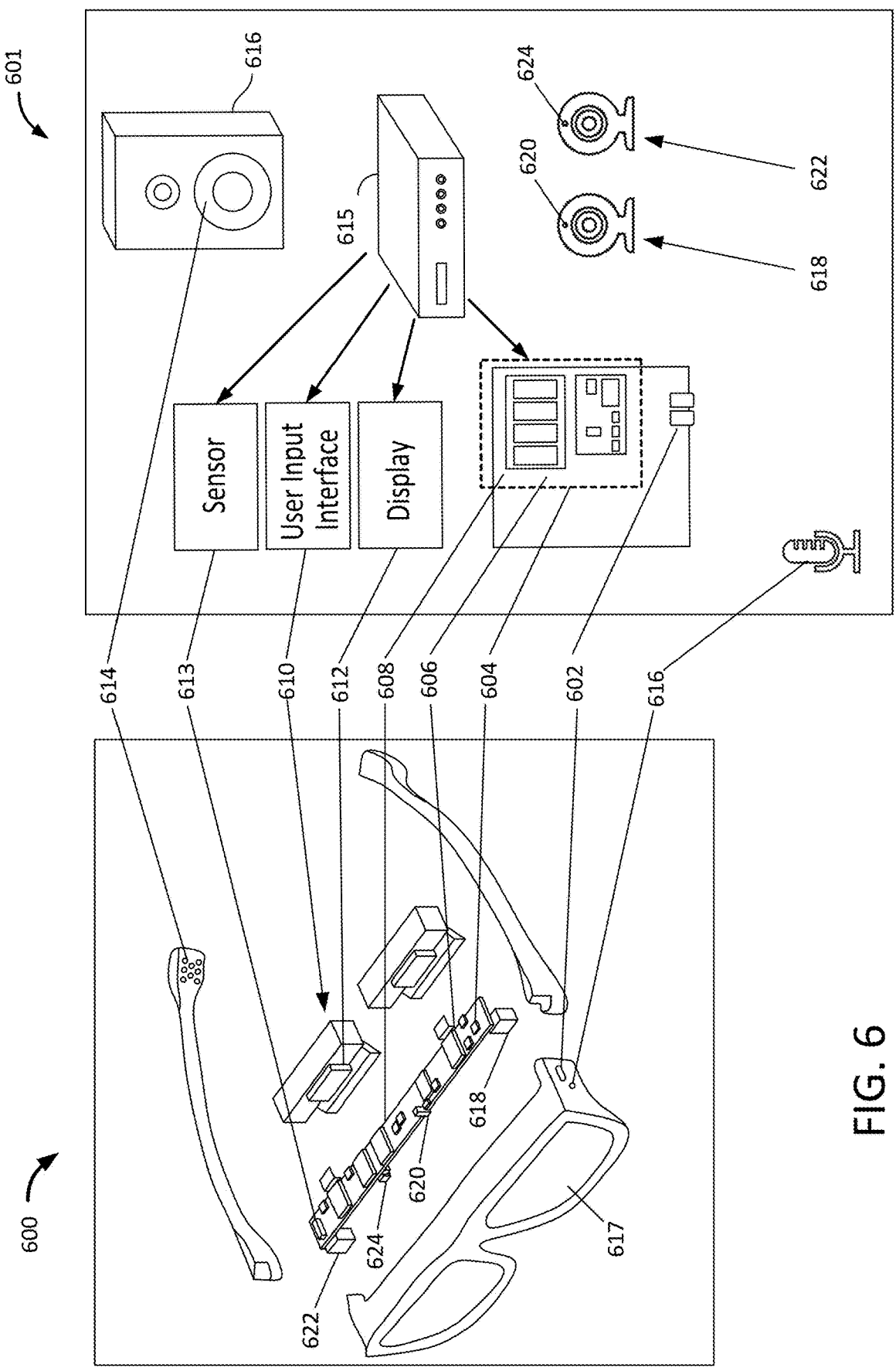
FIG. 6 shows illustrative user equipment devices, in accordance with some embodiments of this disclosure.

FIGS. 6 and 7 describe illustrative devices, systems, servers, and related hardware for providing a social content-viewing experience, in accordance with some embodiments of this disclosure.

FIG. 6 shows illustrative user equipment devices, which may correspond to any of the AR devices 106 of FIGS. 1 and 4 and the media equipment device 108 of FIG. 1, or any other suitable devices, or any combination thereof. The user equipment devices are part of a media system, such as the media system 104 discussed in relation to FIG. 1.

For example, user equipment device 600 may be smart glasses, a virtual reality device, an AR device (e.g., AR devices 106 of FIGS. 1 and 4), a projector or hologram projector, a smartphone device, a tablet, a smart mirror, or any other suitable device capable of displaying an AR media asset (e.g., AR media asset 110, 410, and 430 in FIGS. 1-4) in a 3D environment (e.g., 3D environment 100, 200, and 300 in FIGS. 1-4) and capable of transmitting and receiving data over a communication network. In another example, user equipment device 601 may be a user TV equipment system, smart TV, a smartphone device, a tablet, computer monitor, projector, hologram projector, or suitable device capable of streaming a media asset. User equipment device 601 may include set-top box 615 (e.g., media equipment device 108 of FIG. 1). Set-top box 615 may be communicatively connected to microphone 616, audio output equipment 614 (e.g., speaker or headphones), display 612 (e.g., display of AR devices 106 of FIGS. 1 and 4), and sensor 613. In some embodiments, microphone 616 may receive audio corresponding to a voice of a user, e.g., a voice command. In some embodiments, display 612 may be a TV display or a computer display. In some embodiments, set-top box 615 may be communicatively connected to user input interface 610. In some embodiments, user input interface 610 may be a remote control device. Set-top box 615 may include one or more circuit boards. In some embodiments, the circuit boards may include control circuitry (e.g., control circuitry 190 in FIG. 1), processing circuitry, and storage (e.g., RAM, ROM, hard disk, removable disk, etc.). In some embodiments, the circuit boards may include an input/output path. More specific implementations of user equipment devices are discussed below in connection with FIG. 7. In some embodiments, device 600 may comprise any suitable number of sensors, as well as a GPS module (e.g., in communication with one or more servers and/or cell towers and/or satellites) to ascertain a location of device 600.

Each one of user equipment device 600 and user equipment device 601 may receive content and data via input/output (I/O) path 602. I/O path 602 may provide content (e.g., broadcast programming, on-demand programming, Internet content, content available over a local area network (LAN) or wide area network (WAN), and/or other content) and data to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing. While set-top box 615 is shown in FIG. 6 for illustration, any suitable computing device having processing circuitry, control circuitry, and storage may be used in accordance with the present disclosure. For example, set-top box 615 may be replaced by, or complemented by, a personal computer (e.g., a notebook, a laptop, a desktop), a smartphone, a tablet, a user-worn device (e.g., device 600 as an AR device), a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media system (e.g., media system 104 in FIG. 1) stored in memory (e.g., storage 608). Specifically, control circuitry 604 may be instructed by the media system to perform the functions discussed above and below. The control circuitry 604 may execute applications, such as the media guidance application, eye-tracking application, classification application, and saliency application discussed in relation to FIGS. 1-3, to perform the functions. In some implementations, processing or actions performed by control circuitry 604 may be based on instructions received from the media system.

In client/server-based embodiments, control circuitry 604 may include communications circuitry suitable for communicating with a server or other networks or servers. The media system may be a stand-alone application implemented on a device or a server. The media system may be implemented as software or a set of executable instructions. The instructions for performing any of the embodiments discussed herein of the media system may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a device 600.

In some embodiments, the media system may be a client/server application where only the client application resides on device 600, and a server application resides on an external server (e.g., server 704). For example, the media system may be implemented partially as a client application on control circuitry 604 of device 600 and partially on server 704 as a server application running on control circuitry 711. Server 704 may be a part of a local area network with one or more of devices 600 or may be part of a cloud computing environment accessed via the internet. In a cloud computing environment, several types of computing services for performing searches on the internet or informational databases, providing storage (e.g., for a database) or parsing data are provided by a collection of network-accessible computing and storage resources (e.g., server 704), referred to as "the cloud." Device 600 may be a cloud client that relies on the cloud computing capabilities from server 704 to determine whether processing should be offloaded and facilitate such offloading. When executed by control circuitry 604 or 711, the media system may instruct control circuitry 604 or 711 to perform processing tasks for the client device and facilitate a media consumption session integrated with social network services. The client application may instruct control circuitry 604 to determine whether processing should be offloaded.

Control circuitry 604 may include communications circuitry suitable for communicating with a server, social network service, a table or database server, or other networks or servers. The instructions for carrying out the above-mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store several types of content described herein as well as media system data described above. Nonvolatile memory may also be used (e.g., to launch a boot-up routine and other instructions). Cloud-based storage may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of user equipment device 600. Control circuitry 604 may also include digital-to-analog converter circuitry and analog-to-digital converter circuitry for converting between digital and analog signals. The tuning and encoding circuitry may be used by user equipment device 600, 601 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, head tracking interface, eye tracking interface, or other user input interfaces. Display 612 may be provided as a stand-alone device or integrated with other elements of each one of user equipment device 600 and user equipment device 601. For example, the display 612 of the user equipment device 600 may be a display screen or combiner. In some embodiments, the display 612 includes multiple, stacked displays (e.g., discussed in operations 510 and 512 in FIG. 5) that form more than one depth plane or focal plane. In such embodiments, control circuitry 604 may determine which display, or displays, of the stacked displays to present an AR media asset. In some embodiments, the display 612 includes a movable display (e.g., discussed in operations 520 and 522 in FIG. 5) that move in relation to a user's eye, or move a focal plane in relation to the user's eye. In such embodiments, control circuitry 604 may determine what depth to position the movable display.

The equipment device 600 includes a lens 617. In some embodiments, the lens 617 includes a non-prescription lens. In some embodiments, the lens 617 includes a prescription lens. In some embodiments, the lens 617 includes an adjustable lens (e.g., discussed in operations 530 and 532 in FIG. 5) as part of a varifocal element. In such embodiments, control circuitry 604 may be used to change the focal length of the lens 617. If the lens 617 includes a zoom lens, the control circuitry 604 moves the lens in relation to the display 612. If the lens 617 includes multiple, stacked lenses, the control circuitry 604 may activate or change the focal length of different lenses of the stacked lenses.

The user input interface 610 may include a head tracking interface that tracks the user equipment device 600 movements, and correspondingly the user's field of view, in relation to the 3D environment. The user input interface 610 may include an eye tracking interface that tracks the user's eye movements in relation to the display 612. The display 612 of the user equipment device 601 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Control circuitry 604 may receive information from the sensor 613 (or sensors). The information may include spatial data about nearby surroundings (e.g., 3D environment 100, 200, and 300 in FIGS. 1-4) and objects, including people. Sensor 613 may be any suitable sensor or sensors to detect a position and orientation of the surroundings. The sensor 613 may include transceivers, cameras, sonar, radar, lidar, lasers, global positioning system (GPS) beacons, inertial measurement systems (IMSs), accelerometers, and gyrometers. The sensor 613 may include emitters or projectors and receivers to detect reflections of an emitted source (e.g., electromagnetic waves and soundwaves), and the control circuitry 604 may use a delay between transmitting and receiving to determine positions and orientations of the surroundings. The sensor 613 may perform several measurements in multiple directions. In some embodiments, the control circuitry 604 may use the sensor 613 to scan the surroundings and capture images of one or more objects, which may be used to determine object locations within the environment. In some embodiments, the control circuitry 604 may generate a 3D map of the surroundings, specifying locations of objects and/or locations of users in the surroundings. In some embodiments, the sensor 613 may sense changes in its position over time, which the control circuitry 604 may use to track the position and orientation of an object coupled to the sensor 613. In some embodiments, the sensor 613 is used to track a position of the user equipment device 600, which may be used to determine the user's head and field of view. In some embodiments, a user may be requested by the control circuitry 604 to scan his or her surroundings.

Audio output equipment 614 may be integrated with or combined with display 612. Display 612 may be one or more of a monitor, a TV, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser TV, carbon nanotubes, quantum dot display, interferometric modulator display, or any other suitable equipment for displaying visual images. A video card or graphics card may generate the output to the display 612. Audio output equipment 614 may be provided as integrated with other elements of each one of device 600 and equipment 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card. Light 620 may be used to reflect patterns off the user's eye or to illuminate objects near the devices 600 and 601, and may include light emitting diode (LED) lights or other types of light producing devices. The light 620 may be used with the camera 618. Camera 622 may be an IR or ultraviolet (UV) camera. Light 624 may be an IR or UV emitter that emits light in the IR or UV wavelengths to reflect off the user's eye or nearby objects in the surrounding environment. The camera 622 detects the reflected wavelengths. In some embodiments, the cameras 618 and 622 are used for eye tracking. In some embodiments, the cameras 618 and 622 are the same type of camera. In some embodiments, the lights 620 and 624 are the same type of light. In some embodiments, the cameras 618 and 622 are used as stereo cameras to map the surrounding environment.

The media system may be implemented using any suitable architecture. For example, it may be a stand-alone application wholly-implemented on each one of user equipment device 600 and user equipment device 601. In such an approach, instructions of the application may be stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to provide media consumption and social network interaction functionality and generate any of the displays discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a media system and social network profile. Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the media system is a client/server-based application. Data for use by a thick or thin client implemented on each one of user equipment device 600 and user equipment device 601 may be retrieved on-demand by issuing requests to a server remote to each one of user equipment device 600 and user equipment device 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display may then be transmitted to device 600 for presentation to the user.

In some embodiments, the I/O path 602 may generate the output to the display 612. In some embodiments, the I/O path 602 may include the video generating circuitry. In some embodiments, the I/O path 602 and the control circuitry 604 may both generate the output to the display 612.

In some embodiments, the media system may be downloaded and interpreted or otherwise run by an interpreter or virtual machine (run by control circuitry 604). In some embodiments, the media system may be encoded in the ETV Binary Interchange Format (EBIF), received by control circuitry 604 as part of a suitable feed, and interpreted by a user agent running on control circuitry 604. For example, the media system may be an EBIF application. In some embodiments, the media system may be defined by a series of JAVA-based files that are received and run by a local virtual machine or other suitable middleware executed by control circuitry 604. In some of such embodiments (e.g., those employing MPEG-2 or other digital media encoding schemes), the media system may be, for example, encoded and transmitted in an MPEG-2 object carousel with the MPEG audio and video packets of a program.

FIG. 7 shows illustrative systems, in accordance with some embodiments of this disclosure.

User equipment devices 707, 708, 709, 710 (e.g., user devices 106 and 108 in FIGS. 1 and 4) and/or other connected devices or suitable devices, or any combination thereof, may be coupled to communication network 706. In the depicted embodiment, the user equipment device 707 is a personal computer, user equipment device 708 is an AR headset, user equipment device 709 is a smartphone, and user equipment device 710 is a TV. Communication network 706 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth®, infrared, IEEE 702-11x, etc.), or other short-range communication via wired or wireless paths. The user equipment devices may also communicate with each other directly through an indirect path via communication network 706.

System 700 may comprise media content source 702 (e.g., AR media asset 110, 410, and 430 in FIGS. 1-4), one or more servers 704, and one or more social network services. In some embodiments, the media system may be executed at one or more of control circuitry 711 of server 704 (and/or control circuitry of user equipment devices 707, 708, 709, 710). In some embodiments, spatial data about 3D environments (e.g., 3D environment 100, 200, and 300 in FIGS. 1-4) or objects in the 3D environment (e.g., physical objects 112, 212A-C, 312A, and 312B in FIGS. 1-4), user name and preferences, information about the media content source 702 (e.g., present time point and time remaining), or any other suitable data structure or any combination thereof, may be stored at database 705 maintained at or otherwise associated with server 704, and/or at storage of one or more of user equipment devices 707, 708, 709, 710.

In some embodiments, server 704 may include control circuitry 711 and storage 714 (e.g., RAM, ROM, Hard Disk, Removable Disk, etc.). Storage 714 may store one or more databases 705. Server 704 may also include an input/output path 712. I/O path 712 may provide media consumption data, social networking data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712. I/O path 712 may connect control circuitry 711 (and specifically control circuitry 604) to one or more communications paths. I/O path 712 may comprise I/O circuitry.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 711 executes instructions for an emulation system application stored in memory (e.g., the storage 714). Memory may be an electronic storage device provided as storage 714 that is part of control circuitry 711.

Figure 8:
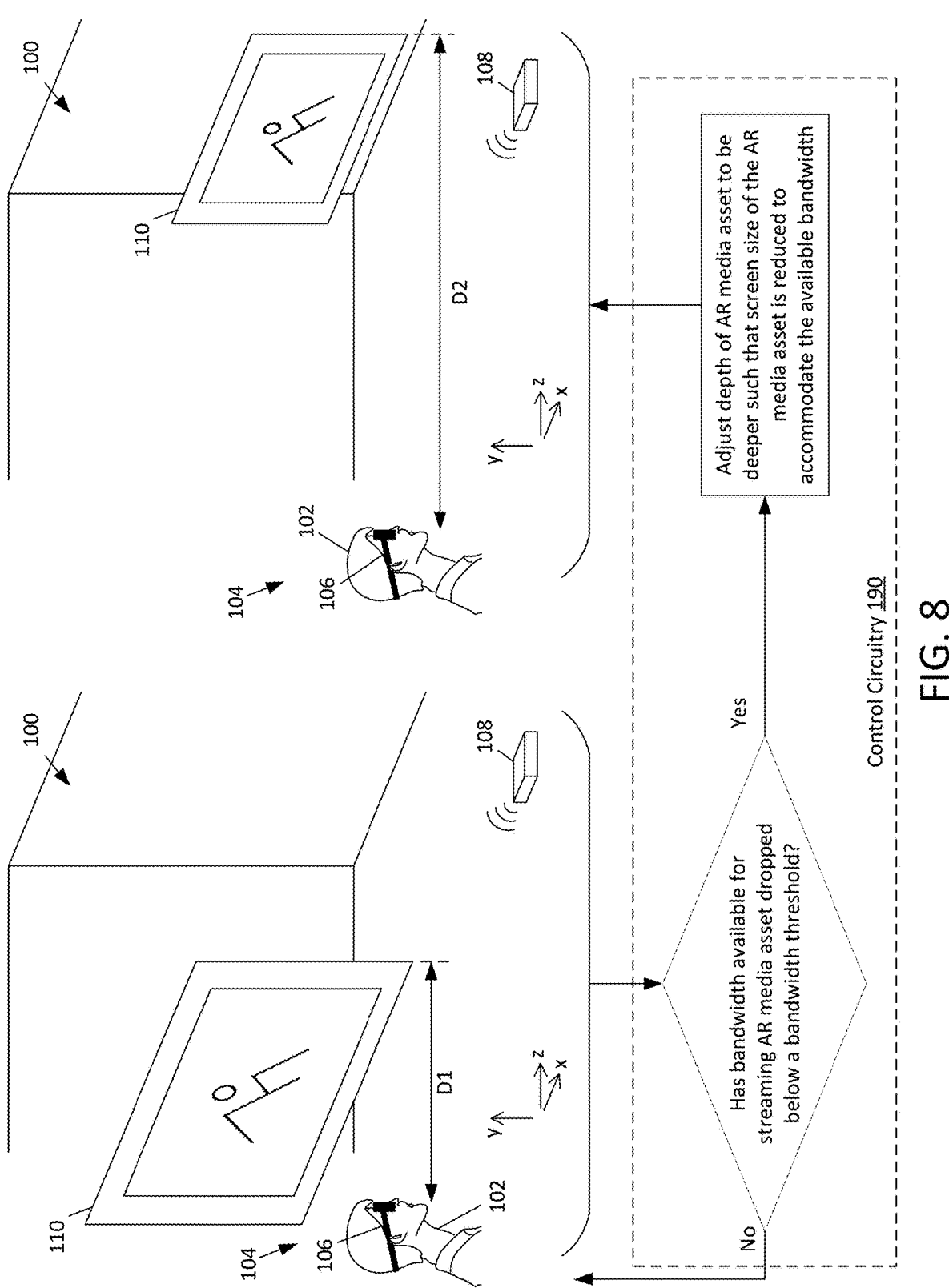
FIG. 8 shows an illustrative diagram of positioning an AR media asset based on a available bandwidth, in accordance with some embodiments of this disclosure.

FIG. 8 shows an illustrative diagram of positioning the AR media asset 110 based on available bandwidth, in accordance with some embodiments of this disclosure. The first and second depths D1 and D2 may be different depths than the first and second depths D1 and D2 depicted in the embodiments of FIGS. 1, 2A, 2B, and 4.

The AR media asset 110 is placed in the 3D environment 100, which includes the physical object 212A. The AR media asset 110 is moved based on the bandwidth used to display the AR media asset 110. For example, if the bandwidth available to stream the AR media asset 110 to the display of the AR device 106 is reduced below a bandwidth threshold, then the AR media asset 110 may be adjusted to use the reduced bandwidth by requesting segments at a lower bitrate.

The AR media asset may be moved to a depth in the 3D environment that is greater than the first depth D1, such as to a second depth D2. The display size is reduced as the depth of the AR media asset is increased. The resolution of the AR media asset 110 remains unchanged. In some embodiments, the resolution of the AR media asset 110 may change instead of, or in addition to, the size of the AR media asset 110. The first and second depths D1 and D2 may be different depths than the first, second, and third depths D1, D2, and D3 depicted in the embodiment of FIG. 1.

In some embodiments, multiple bandwidth thresholds may be used such that each of the thresholds corresponds to a different depth to display the AR media asset 110. The manifest file for the streamed media asset can include different renditions for different depths and depending on the placement or position of the spatial screen by the AR glass, corresponding renditions are utilized to request and retrieve content.

In some embodiments, a bandwidth stability threshold is used to prevent frequent resizing of the AR media asset due to a varying bandwidth. For example, the repositioning of the spatial screen may occur in response to a determination that the bandwidth drop lasted more than x-seconds (e.g., 10 seconds) and a buffer underrun may occur (i.e., there is not enough content in the buffer and additional segments need to be requested).

FIG. 9A shows an illustrative diagram of presenting a notification 940 based on a user's gaze, in accordance with some embodiments of this disclosure.

A media system (e.g., media system 104 in FIG. 1) positions the AR media asset 110 in the 3D environment 200, which includes the first physical object 212A, the second physical object 212B, and the third physical object 212C. The AR device 106 presents the notification 940 to the user 102 to confirm that the user 102 is focusing on the AR media asset 110. For example, if the media system (e.g., media system 104 in FIG. 1) determines the user 102 is focused on an object in the physical environment, such as the first physical object 212A, then the display of the AR device 106 presents the notification 940 to the user 102. The notification 940 is a text prompt soliciting confirmation, such as "Are You Still Watching?". In some embodiments, the notification 940 is a voice prompt used to prompt the user through speakers or headphones connected to the AR device 106. The user 102 may respond to the notification 940 through a user interface input, through a selection or cursor input, voice command, or gesture, informs the device on whether the user's focus is still on the AR media asset 110. In some embodiments, if the user is focused on an object other than the AR media asset 110, the AR media asset 110 may be paused, have its transparency reduced, or be hidden until the user 102 notifies the AR headset to resume playing of the AR media asset 110.

FIG. 9B shows an illustrative diagram of pausing the AR media asset 110 based on a user's gaze, in accordance with some embodiments of this disclosure. FIG. 9C shows an illustrative diagram of hiding the AR media asset 110 based on a user's gaze, in accordance with some embodiments of this disclosure. FIGS. 9B and 9C are alternative embodiments of the media system discussed in relation to FIG. 9A.

Referring to FIG. 9B, the AR media asset 110 is paused when the user's gaze is focused on the first physical object 212A. A "play" icon 942 is displayed over a still frame or image of the AR media asset 110. In some embodiments, the play icon 942 is displayed over a rectangle of a solid color having the same shape as the AR media asset 110. In some embodiments, the play icon 942 is displayed over an image representing the AR media asset 110, such as a movie poster or album art. In some embodiments, the play icon 942 is displayed without the AR media asset 110. In some embodiments, a "pause" icon is displayed instead of the play icon 942.

Referring to FIG. 9C, the AR media asset 110 is hidden when the user's gaze is focused on the first physical object 212A. The AR media asset 110 may be hidden by turning its transparency to 100%, by minimizing the AR media asset 110 on the display of the AR device 106, or by closing the AR media asset 110 with a flag noting a time in the AR media asset 110 to resume from. In some embodiments, the transparency of the AR media asset 110 is increased such that the media asset is still partially visible, such as at least 75% transparent, such as at least 80% transparent, such as at least 90% transparent, such as at least 95% transparent, such as at least 98% transparent, such as 100% transparent.

FIG. 10 is flowchart of a detailed illustrative process 1000 for positioning an AR media asset (e.g., AR media asset 110, 410, and 430 in FIGS. 1-4 and 8-9) to a different depth, in accordance with some embodiments of this disclosure.

The process 1000 begins at operation 1002 with control circuitry (e.g., control circuitry 604 and 711 in FIGS. 6 and 7) generating for display on an AR device (e.g., AR device 106 in FIGS. 1 and 4) of a user (e.g., user 102 in FIGS. 1 and 4), in a 3D environment (e.g., 3D environment 100, 200, and 300 in FIGS. 1-4), the AR media asset at a first depth. In some embodiments, input/output circuitry (e.g., I/O path 602 and 712 in FIGS. 6 and 7) provides the media asset to the control circuitry. In some embodiments, a media guidance application provides the media asset.

The process 1000 continues to operation 1004 with a control circuitry decision on whether a gaze of the user is focused in the 3D environment at a second depth that is deeper than the first depth of the AR media asset. In some embodiments, the control circuitry may use an eye-tracking application to determine where the gaze of the user is focused. If the determination is no, then the process 1000 returns to operation 1002.

If the determination is yes, the process 1000 continues to operation 1006 with the control circuitry modifying the 3D environment such that the AR media asset is positioned in the 3D environment at a third depth that is deeper than the second depth.

The process 1000 continues to operation 1008 with a control circuitry decision on whether a gaze of the user is focused in the 3D environment on the AR media asset at the third depth for the attention threshold. If the determination is yes, then the process 1000 returns to operation 1002.

If the determination is no, then the process 1000 continues to operation 1010 with the control circuitry continuing to display the AR media asset at the third depth. The process 1000 continues to operation 1008.

In some embodiments, the process 1000 continues (e.g., after operation 1010) with the control circuitry determining if the gaze of the user is focused in the 3D environment at a depth that is deeper than the AR media asset. In such embodiments, the control circuitry may modify the 3D environment to position the AR media asset at a depth that is deeper than the depth at which the user is focused. In some embodiments, when the AR media asset has been positioned at a deeper depth (e.g., deeper than the third depth) and the gaze of the user has been focused at the deeper depth of the AR media asset for the attention threshold, the control circuitry may generate the AR media asset for display at a previous depth, which may be less deep than the first depth.

Figure 11:
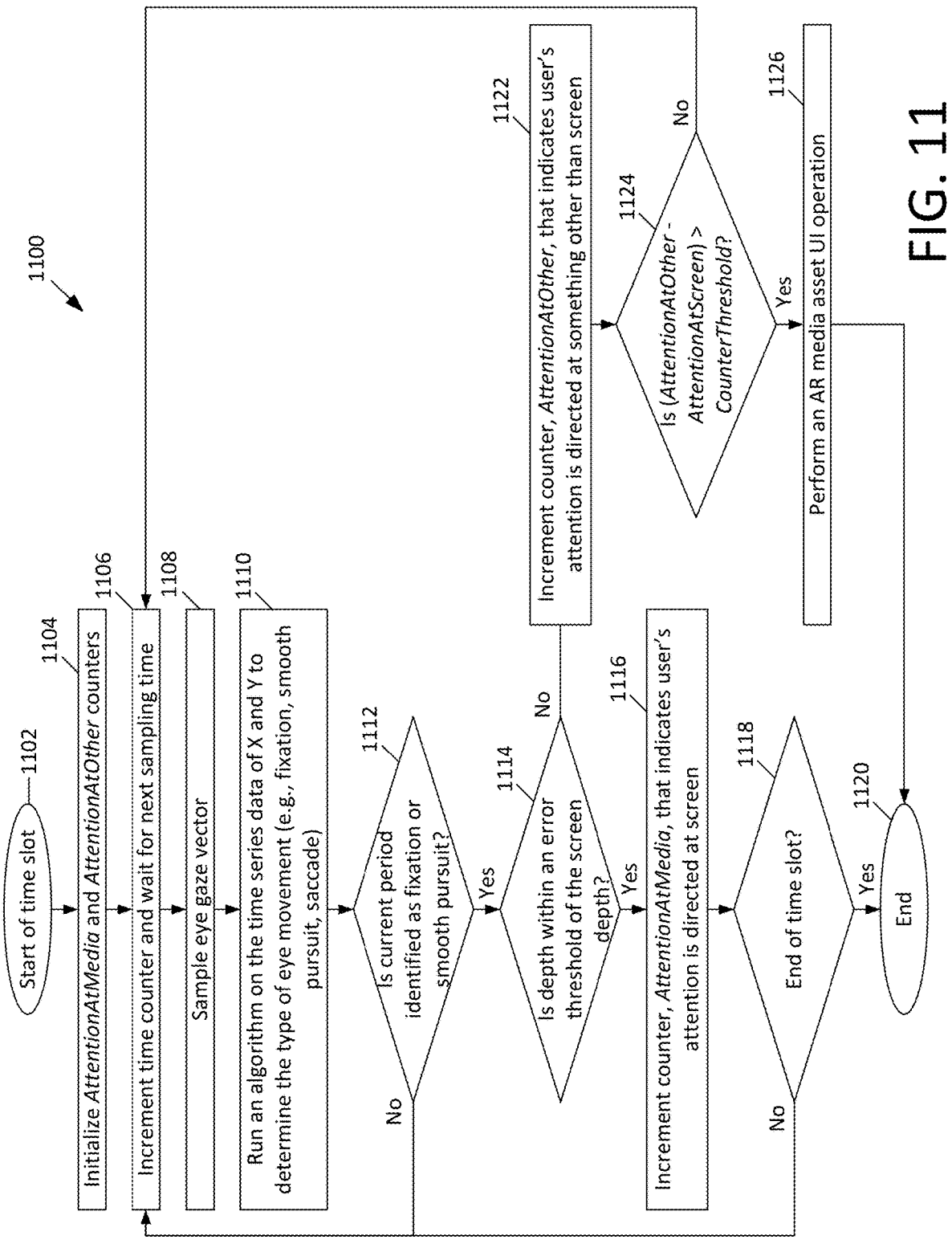
FIG. 11 is a flowchart of a detailed illustrative process for positioning an AR media asset to a different depth based on a user's gaze, in accordance with some embodiments of this disclosure.

FIG. 11 is a flowchart of a detailed illustrative process 1100 for positioning an AR media asset (e.g., AR media asset 110, 410, and 430 in FIGS. 1-4 and 8-9) to a different depth based on a user's gaze, in accordance with some embodiments of this disclosure. In some embodiments, the process 1100 occurs during operations 1004 and/or 1008 discussed in relation to FIG. 10.

The process 1100 starts at operation 1102 with control circuitry (e.g., control circuitry 604 and 711 in FIGS. 6 and 7) starting a time slot of a time counter. The time slot may be a discrete period of time. In some embodiments, the time slot is a fixed period of time.

The process 1100 continues to operation 1104 with the control circuitry initializing a counter to indicate the user's attention is directed at the AR media asset, referred to as "AttentionAtMedia," and a counter to indicate the user's attention is directed at something other than the AR media asset, referred to as "AttentionAtOther." In some embodiments, AttentionAtMedia is a period of time the eye movements are focused on the AR media asset. AttentionAtOther is a period of time the user is focused on an object in the physical environment. The control circuitry resets counters AttentionAtMedia and AttentionAtOther if they had previously been initialized.

The process 1100 continues to operation 1106 with the control circuitry incrementing the time counter and waiting for a next sampling time period. In some embodiments, the sampling period is at least 60 HZ, such as at least 120 Hz. In some embodiments, the sampling frequency is at least 600 Hz. In some embodiments, the sampling frequency is at least 1200 Hz.

The process 1100 continues to operation 1108 with the control circuitry sampling an eye gaze vector for a sampling time period. In some embodiments, the control circuitry may use the cameras 618 and 622 and the lights 620 and 624 discussed in relation to FIG. 6 to sample the eye gaze vectors.

The process 1100 continues to operation 1110 with the control circuitry determining a type of eye movement based on the eye gaze vectors sampled during the sampling time period. In some embodiments, the control circuitry may use an eye-tracking application to determine the type of eye movement. In some embodiments, the eye-tracking application uses x, y data points of the eye gaze vectors to determine the type of eye movement.

The process 1100 continues to operation 1112 with a control circuitry decision on whether the type of eye movement for the time slot is fixation or smooth pursuit. The type of eye movement may be determined using an object focus threshold. For example, the eye movement is determined to be fixation if the type of eye movement is fixation for a period of time, during the time slot, that is greater than the object focus threshold. The object focus threshold may be at least 0.5 seconds, such as at least 1 second, such as at least 1.5 seconds, such as at least 2 seconds, such as at least 3 seconds, such as at least 5 seconds. If the determination is no, the process 1100 continues to operation 1106 with the control circuitry starting a new time slot.

If the determination is yes, the process 1100 continues to operation 1114 with a control circuitry decision on whether a depth of the eye gaze vectors is within a screen depth error threshold of the depth of the AR media asset. In some embodiments, the depth may be the z-value of the eye gaze vectors.

If the depth is within a screen depth error threshold, the process 1100 continues to operation 1116 with the control circuitry incrementing the AttentionAtMedia counter.

The process 1100 continues to operation 1118 with a control circuitry decision on whether the time slot has ended. If the determination is no, the process continues to operation 1106.

If the determination is yes, the process 1100 continues to operation 1120 and the control circuitry stops the process 1100 for the time slot. In some embodiments, the process

1100 is complete. In some embodiments, the process returns to operation 1102 and the control circuitry starts a new time slot.

If the depth is not within (e.g., is outside of) a screen depth error threshold, the process 1100 continues to operation 1122 with the control circuitry incrementing the AttentionAtOther counter.

The process 1100 continues to operation 1124 with a control circuitry decision on whether subtracting the AttentionAtMedia counter value from the AttentionAtOther counter value results in a value greater than a counter threshold (referred to as "CounterThreshold"). The counter threshold may be at least 0.25 seconds, such as at least 0.5 seconds, such as at least 0.75 seconds, such as at least 1 second, such as at least 1.5 seconds. If the decision is no, the process 1100 returns to operation 1106.

If the decision is yes, the process 1100 continues to operation 1126 with the control circuitry performing a media asset user interface (UI) operation. In some embodiments, the UI operation includes moving or positioning the AR media asset to a depth that is deeper than the depth of the eye gaze vectors. In some embodiments, the UI operation includes pausing playing of the AR media asset, which may include displaying a thumbnail icon or a paused indicator. In some embodiments, the UI operation includes presenting a notification to confirm that the user's attention is directed to something other than the AR media asset. In some embodiments, the UI operation includes adjusting the transparency of at least a portion of the AR media asset.

The process 1100 continues to operation 1120.

The embodiments discussed above are intended to be illustrative and not limiting. One skilled in the art would appreciate that individual aspects of the apparatus and methods discussed herein may be omitted, modified, combined, and/or rearranged without departing from the scope of the disclosure. Only the claims that follow are meant to set bounds as to what the present disclosure includes.

What is claimed is:

1. A method comprising:
   generating for display on an augmented reality (AR) device of a user, in a three-dimensional (3D) environment, an AR media asset at a first depth;
   determining a gaze of the user is focused in the 3D environment at a second depth that is deeper than the first depth of the AR media asset by determining a type of eye movement of the user is fixation or smooth pursuit for a period of time greater than an object focus threshold; and
   in response to the determining the gaze of the user is focused in the 3D environment at the second depth, modifying the 3D environment such that the AR media asset is repositioned in the 3D environment at a third depth that is deeper than the second depth.

2. The method of claim 1, wherein the determining the gaze of the user is focused in the 3D environment at the second depth comprises:
   determining the difference between the first depth and the second depth is greater than a screen depth error threshold.

3. The method of claim 1, further comprising:
   determining that an available bandwidth used to display the AR media asset on the AR device is below a bandwidth threshold; and
   in response to the determining that the available bandwidth used to display the AR media asset on the AR device is below the bandwidth threshold, modifying the size of a spatial screen of the AR device.

4. The method of claim 1, further comprising determining the difference between a period of time the gaze of the user is focused at the second depth and a period of time the user is focused at the first depth is greater than a counter threshold.

5. The method of claim 1, wherein the determining the gaze of the user is focused in the 3D environment at the second depth comprises:

determining a saliency value for a region that the gaze of the user is focused on in the 3D environment at the second depth, wherein the saliency value is determined using a saliency map of the 3D environment; and determining the saliency value exceeds a saliency threshold.

6. The method of claim 1, wherein the AR media asset swivels in the 3D environment when the AR device swivels.

7. The method of claim 1, further comprising:

determining the gaze of the user is focused in the 3D environment on the AR media asset at the third depth for a period of time greater than an attention threshold; and in response to the determining the gaze of the user is focused in the 3D environment at the third depth for the period of time greater than the attention threshold, modifying the 3D environment such that the AR media asset is repositioned in the 3D environment at the first depth.

8. The method of claim 1, wherein:

the AR media asset is a show; and the method further comprises in response to the determining the gaze of the user is focused in the 3D environment at the second depth:

pausing playing of the show.

9. The method of claim 1, further comprising in response to determining the gaze of the user is focused in the 3D environment at a second depth:

reducing a transparency of at least a portion of the AR media asset.

10. A system comprising:

input/output circuitry configured to:

receive an augmented reality (AR) media asset; and control circuitry configured to:

generate for display on an AR device of a user, in a three-dimensional (3D) environment, the AR media asset at a first depth;

determine a gaze of the user is focused in the 3D environment at a second depth that is deeper than the first depth of the AR media asset by determining a type of eye movement of the user is fixation or smooth pursuit for a period of time greater than an object focus threshold; and in response to determining the gaze of the user is focused in the 3D environment at the second depth, modify the 3D environment such that the AR media asset is repositioned in the 3D environment at a third depth that is deeper than the second depth.

11. The system of claim 10, wherein determining the gaze of the user is focused in the 3D environment at the second depth may occur by:

determining the difference between the first depth and the second depth is greater than a screen depth error threshold.

12. The system of claim 10, wherein the control circuitry is configured to:

determine that an available bandwidth used to display the AR media asset on the AR device is below a bandwidth threshold; and in response to determining that the available bandwidth used to display the AR media asset on the AR device is below the bandwidth threshold, modify the size of a spatial screen of the AR device.

13. The system of claim 10, wherein the control circuitry is configured to:

determine the difference between a period of time the gaze of the user is focused at the second depth and a period of time the user is focused at the first depth is greater than a counter threshold.

14. The system of claim 10, wherein determining the gaze of the user is focused in the 3D environment at the second depth may occur by:

determining a saliency value for a region that the gaze of the user is focused on in the 3D environment at the second depth, wherein the saliency value is determined using a saliency map of the 3D environment; and determining the saliency value exceeds a saliency threshold.

15. The system of claim 10, wherein the AR media asset swivels in the 3D environment when the AR device swivels.

16. The system of claim 10, wherein the control circuitry is configured to:

determine the gaze of the user is focused in the 3D environment on the AR media asset at the third depth for a period of time greater than an attention threshold; and in response to determining the gaze of the user is focused in the 3D environment at the third depth for the period of time greater than the attention threshold, modify the 3D environment such that the AR media asset is repositioned in the 3D environment at the first depth.

17. The system of claim 10, wherein:

the AR media asset is a show; and the control circuitry is configured to, in response to determining the gaze of the user is focused in the 3D environment at the second depth:

pause playing of the show.

18. The system of claim 10, wherein the control circuitry is configured to, in response to determining the gaze of the user is focused in the 3D environment at a second depth:

reduce a transparency of at least a portion of the AR media asset.

* * * * *